US011198154B2

(12) United States Patent
Shim et al.

(10) Patent No.: US 11,198,154 B2
(45) Date of Patent: Dec. 14, 2021

(54) METHOD AND APPARATUS FOR PROVIDING VIBRATION IN ELECTRONIC DEVICE

(71) Applicant: Samsung Electronics Co., Ltd., Suwon-si (KR)

(72) Inventors: Sang-Won Shim, Incheon (KR); Yonggu Lee, Seoul (KR); Joongsam Yun, Seoul (KR); Minkoo Kang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 6 days.

(21) Appl. No.: 16/488,507

(22) PCT Filed: Feb. 22, 2018

(86) PCT No.: PCT/KR2018/002183
§ 371 (c)(1),
(2) Date: Aug. 23, 2019

(87) PCT Pub. No.: WO2018/155926
PCT Pub. Date: Aug. 30, 2018

(65) Prior Publication Data
US 2020/0230647 A1 Jul. 23, 2020

(30) Foreign Application Priority Data

Feb. 23, 2017 (KR) .......................... 10-2017-0024311

(51) Int. Cl.
G06F 3/01 (2006.01)
B06B 1/02 (2006.01)

(52) U.S. Cl.
CPC ................ B06B 1/02 (2013.01); G06F 3/017 (2013.01)

(58) Field of Classification Search
CPC .. B08B 1/02; H02K 7/065; G06F 3/01; G06F 3/017; H04M 19/047
See application file for complete search history.

(56) References Cited

U.S. PATENT DOCUMENTS 8,452,345 B2 * 5/2013 Lee ........................ H04M 19/04
455/567
8,653,352 B2 2/2014 Wauke
(Continued)

FOREIGN PATENT DOCUMENTS

| JP | 2003-275681 A | 9/2003 |
| JP | 2014-123293 A | 7/2014 |
| KR | 10-2010-0069736 A | 6/2010 |
| KR | 10-2011-0029436 A | 3/2011 |
| KR | 10-2013-0113191 A | 10/2013 |

(Continued)

OTHER PUBLICATIONS

European Office Action dated Sep. 17, 2020, issued in European Application No. 18758485.9.
(Continued)

Primary Examiner — Kwang-Su Yang
(74) Attorney, Agent, or Firm — Jefferson IP Law, LLP

(57) ABSTRACT

Disclosed are a method and an apparatus for converting a musical element so as to provide a vibration in an electronic device. According to various embodiments of the present invention, an electronic device may comprise: a display; a vibration generation apparatus for generating a vibration; and a processor functionally connected to the display and the vibration generation apparatus, wherein the processor is configured to: select multiple frequencies, using a musical element; set at least one vibration on the basis of the selected multiple frequencies; and generate a vibration pattern on the basis of the set vibration. Various elements are possible.

18 Claims, 22 Drawing Sheets

(56) References Cited

U.S. PATENT DOCUMENTS

| | | | |
|---|---|---|---|
| 2002/0166438 A1* | 11/2002 | Nishitani | G10H 1/0083 84/600 |
| 2009/0292990 A1* | 11/2009 | Park | G06F 3/0485 715/702 |
| 2010/0004028 A1* | 1/2010 | Park | H04M 1/72583 455/566 |
| 2010/0148942 A1 | 6/2010 | Oh et al. | |
| 2010/0202622 A1 | 8/2010 | Hardee et al. | |
| 2012/0224719 A1 | 9/2012 | Johansson | |
| 2013/0163785 A1 | 6/2013 | Lee et al. | |
| 2013/0194219 A1 | 8/2013 | Modarres et al. | |
| 2014/0064516 A1 | 3/2014 | Cruz-Hernandez et al. | |
| 2015/0277611 A1 | 10/2015 | Sugiyama et al. | |
| 2016/0163165 A1 | 6/2016 | Morrell et al. | |

FOREIGN PATENT DOCUMENTS

| | | |
|---|---|---|
| KR | 10-2015-0080740 A | 7/2015 |
| WO | 2013/088437 A1 | 6/2013 |
| WO | 2013/186901 A1 | 12/2013 |

OTHER PUBLICATIONS

POSTECH's research team clarifies 'I feel the vibration chord', http://www.yonhapnews.co.kr/society/2014/06/18/0703000000AKR20140618126900053.HTML.

Yoo et al., Consonance of Vibrotactile Chords, IEEE Transactions On Haptics, vol. 7, No. 1, Jan.-Mar. 2014.

European Search Report dated Nov. 22, 2019, issued in the European Application No. 18758485.9.

\* cited by examiner

FIG.12A  Existing On/Off vibration 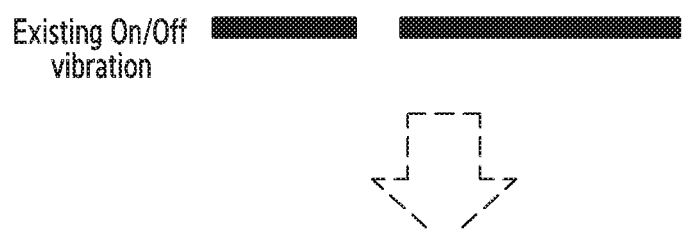
FIG.12B  Feel of chord-harmony + Existing On/Off vibration 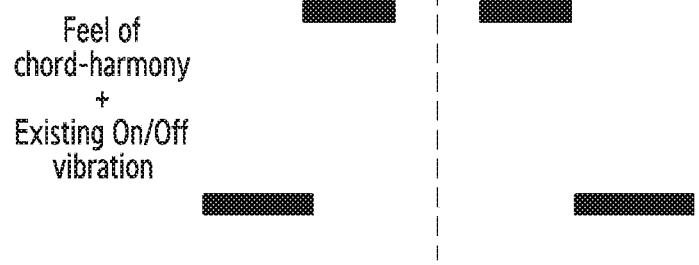

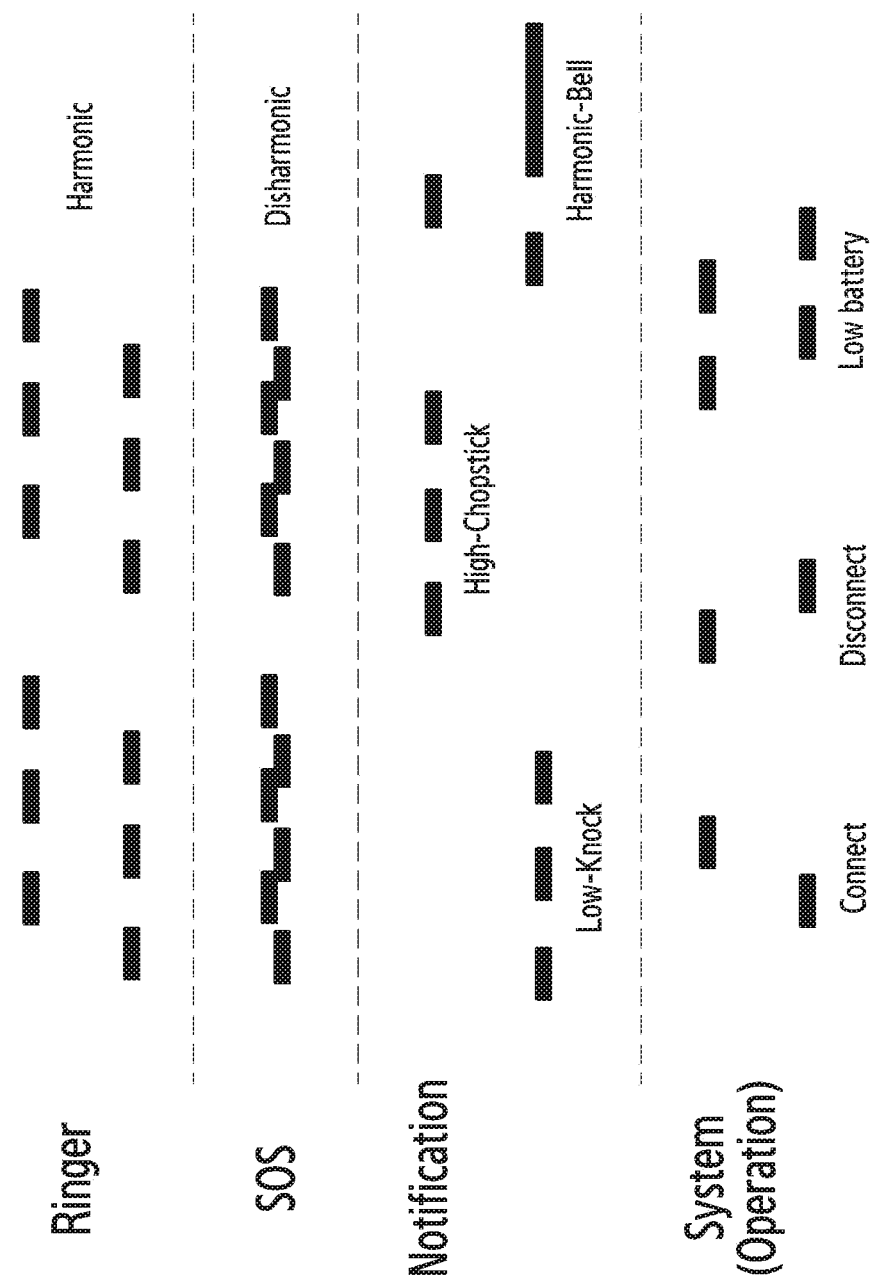

METHOD AND APPARATUS FOR PROVIDING VIBRATION IN ELECTRONIC DEVICE

CROSS-REFERENCE TO RELATED APPLICATION(S)

This application is a U.S. National Stage application under 35 U.S.C. § 371 of an International application number PCT/KR2018/002183, filed on Feb. 22, 2018, which is based on and claimed priority of a Korean patent application number 10-2017-0024311, filed on Feb. 23, 2017, in the Korean Intellectual Property Office, the disclosure of which is incorporated by reference herein in its entirety.

TECHNICAL FIELD

The disclosure relates to a method and apparatus for providing a vibration in an electronic device.

BACKGROUND ART

As digital technologies have been developed, various types of electronic devices have come to be popular, such as a mobile communication terminal, a smart phone, a tablet personal computer (PC), a notebook, a personal digital assistant (PDA), a wearable device, a digital camera, a personal computer, or the like.

An electronic device may use at least one of sound (e.g., a sound output by a speaker), display (e.g., display using a display or a lamp), or vibration (e.g., a vibration output by a vibration motor) as a scheme for informing (notifying) a user of an electronic device of reception of a message, various alarms, or the like.

Generally, a vibration scheme of an electronic device may adjust the amount of current (or voltage) flowing into a vibration motor of the electronic device so as to adjust the strength or speed of the vibration motor when vibrating the electronic device. For example, the vibration motor may convert input electric energy into mechanical energy (or kinetic energy), and the driving principle is based on Fleming's rule. Also, an operating frequency band may be set for the vibration motor, and only a single kind of vibration is capable of being output on the basis of a single frequency in the corresponding frequency band.

Therefore, an existing electronic device provides a single kind of vibration based on a single frequency by adjusting only the intensity or speed of the vibration. For example, the existing electronic device generates a vibration with a predetermined pattern in a single direction. Accordingly, the vibration is simple, and may be unable to provide a user with feedback appropriate for respective situations associated with various notifications, which is a drawback.

DISCLOSURE OF INVENTION

Technical Problem

An existing electronic device provides a vibration by fixedly applying a simple predetermined vibration pattern. Accordingly, feedback based on a vibration (hereinafter, "vibration feedback") from the existing electronic device may not be intuitively recognized by a user, and the ability of the feedback to indicate the type of situation may be limited. Accordingly, the usability (e.g., the frequency of use, or the like) by a user may be low. Accordingly, there is increasing user demand for vibration feedback capable of distinctively providing an intuitive notification (e.g., the reception of a call, the reception of a message, a notification, a warning, and the like) and of representing various situations (e.g., a vibration with rhythm based on consonance/dissonance, a vibration with a melody, and the like).

According to various embodiments, there is provided a method and apparatus for providing vibration feedback based on a musical element in an electronic device.

According to various embodiments, there is provided a method and apparatus for providing vibration based on a melody by generating a vibration pattern using multiple vibrations based on frequencies corresponding to a musical element in an electronic device including a vibration-generating device (e.g., a motor, a vibrator, an actuator, a haptic generation device, or the like) supporting multiple frequencies.

According to various embodiments, there is provided a method and apparatus for performing conversion to chord frequencies on the basis of a musical element, and mapping the chord frequencies to consonance/dissonance, so as to provide a new vibration.

According to various embodiments, there is provided a method and apparatus for representing the feel of a vibration that is more dynamic and has a large variation, via multiple vibrations based on multiple frequencies, improving user recognition of a vibration notification, and providing experience of various notification vibration patterns.

According to various embodiments, there is provided a method and apparatus for generating a vibration pattern on the basis of multiple vibrations based on multiple frequencies corresponding to a musical element and providing a vibration with rhythm and an intuitive vibration feedback for respective notification situations.

Solution to Problem

In accordance with an aspect of the disclosure, there is provided an electronic device, including: a display; a vibration-generating device configured to generate a vibration; and a processor functionally connected to the display and to the vibration-generating device, and configured to: select multiple frequencies using a musical element; set at least one vibration on the basis of the selected multiple frequencies; and generate a vibration pattern on the basis of the set vibration.

In accordance with another aspect of the disclosure, there is provided an operation method of an electronic device, the method including: selecting multiple frequencies using a musical element from a frequency band supported by a vibration-generating device; set at least one vibration on the basis of the selected multiple frequencies; and generate a vibration pattern on the basis of the set vibration.

In order to solve the technical problem, various embodiments of the disclosure may include a computer-readable recording medium having a program recorded therein to perform the method by a processor.

Advantageous Effects of Invention

According to an electronic device and an operation method therefor according to various embodiments, an electronic device including a vibration-generating device that supports multiple frequencies may generate a vibration pattern using multiple vibrations based on frequencies corresponding to a musical element, and may provide a melody-based vibration. For example, according to various embodiments, various kinds of vibration feedback based on a musical element (e.g., a tempo, a length, repetition, a pitch, a scale, or the like) may be provided to a user via a vibration-generating device that supports multiple frequencies. According to various embodiments, conversion to chord frequencies is performed on the basis of a musical element and the chord frequencies are mapped to consonance/dissonance, and thus a new vibration may be provided. Accordingly, an electronic device according to various embodiments may represent the feel of a vibration that is more dynamic and has a large variation, may improve user recognition of a vibration notification, and may provide experience of various notification vibration patterns.

According to various embodiments, a vibration pattern is generated on the basis of multiple vibrations based on multiple frequencies corresponding to a musical element, and a vibration with rhythm and intuitive vibration feedback for respective notification situations may be provided to a user. An electronic device according to various embodiments can contribute to improved usability, convenience, or applicability.

BRIEF DESCRIPTION OF DRAWINGS

FIG. 12A is a diagram illustrating an example of providing a vibration in an electronic device according to various embodiments;

FIG. 12B is a diagram illustrating an example of providing a vibration in an electronic device according to various embodiments;

FIG. 13 is a diagram illustrating examples of providing a vibration in an electronic device according to various embodiments;

BEST MODE FOR CARRYING OUT THE INVENTION

Figure 1:
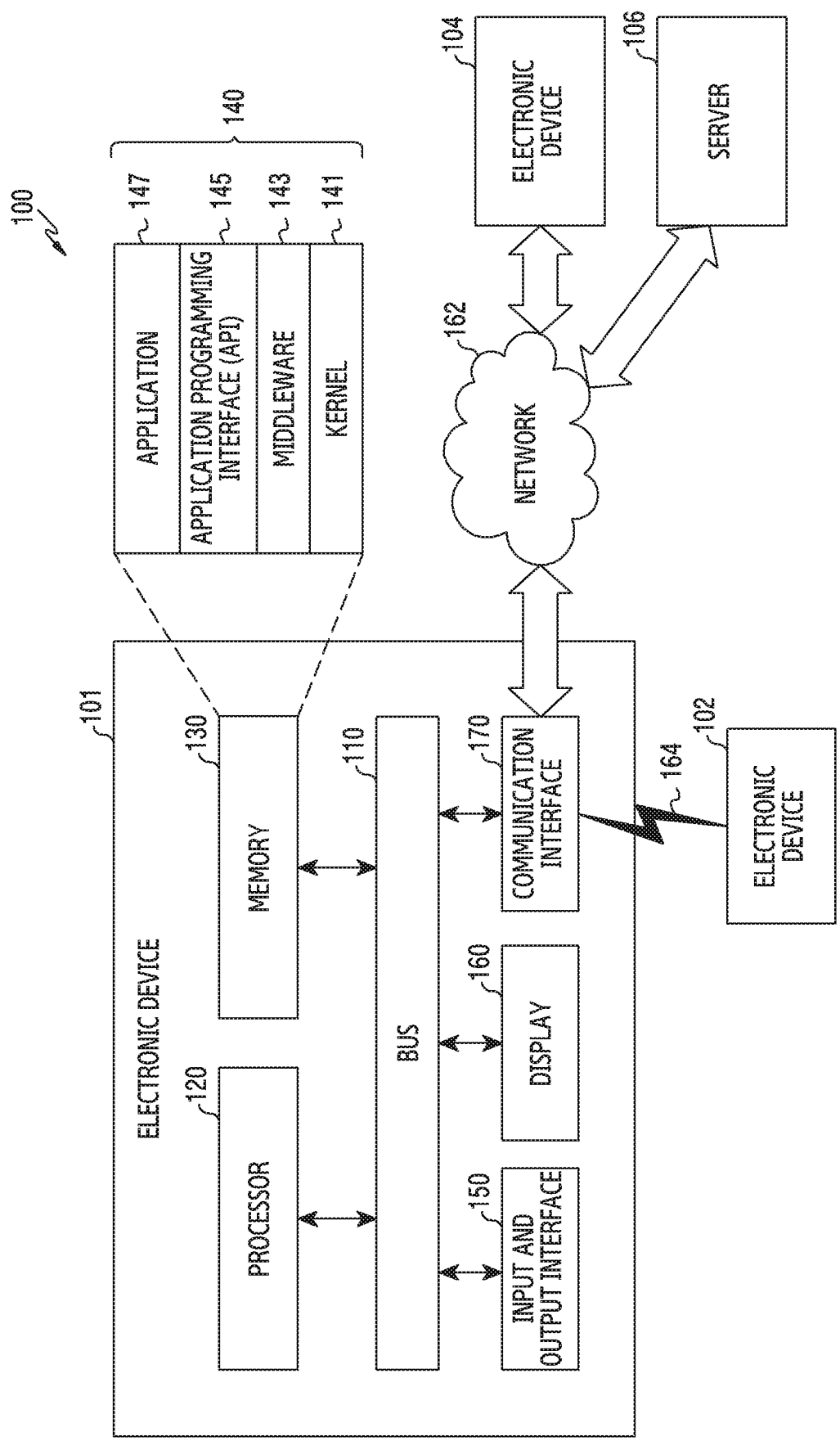
FIG. 1 is a diagram illustrating a network environment including an electronic device according to various embodiments.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements.

A singular expression may include a plural expression unless they are definitely different in a context. As used herein, the expression "A or B" or "at least one of A and/or B" may include all possible combinations of items enumerated together. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), Magnetic Resonance Angiography (MRA), Magnetic Resonance Imaging (MRI), Computed Tomography (CT) machine, and ultrasonic machine), a navigation device, a Global Positioning System (GPS), an Event Data Recorder (EDR), a Flight Data Recorder (FDR), an in-vehicle infotainment device, a ship electronic device (e.g., ship navigation device, gyro-compass, etc.), avionics, a security device, an vehicle head unit, an industrial or home robot, an Automatic Teller Machine (ATM) in banks, Point Of Sales (POS) in shops, and an Internet of things device (e.g., light bulb, various sensors, electric or gas meter, sprinkler device, fire alarm, thermostat, streetlamp, toaster, exercising machine, hot water tank, heater, boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

FIG. 1 is a diagram illustrating a network environment including an electronic device according to various embodiments.

An electronic device 101 within a network environment 100, according to various embodiments, is described with reference to FIG. 1. The electronic device 101 may include a bus 110, a processor 120 (e.g., a processor including a processing circuitry), a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and transmits communication (e.g., control messages or data) between the elements.

The processor 120 may include one or more of a central processing unit, an application processor (AP), and a communication processor (CP). The processor 120, for example, may carry out operations or data processing relating to the control and/or communication of at least one other element of the electronic device 101. The processing (or controlling) operation by the processor 120 according to various embodiments will be described later in detail with reference to drawings.

The memory 130 may include a volatile memory and/or a nonvolatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The memory 130 may store one or more programs executed by the processor 120, and may also perform a function of temporarily storing input/output data. The input/output data may include, for example, a video file, an image (e.g., picture) file, a vibration pattern, an audio file, or the like. According to various embodiments, the memory 130 is in charge of storing obtained data, may store data obtained in real time in a temporary storage device (e.g., a buffer), and may store data, determined to be stored, in a storage device capable of storing data for a long time. The memory 130 may include a computer-readable recording medium that records a program for implementing a method according to various embodiments in the processor 120.

The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface through which the middleware 143, the API 145, or the application programs 147 may access the individual elements of the electronic device 101 to control or manage system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priority to use the system resources (e.g., the bus 110, the processor 120, the memory 130, or the like) of the electronic device 101 to one or more of the application programs 147, and may process the one or more task requests.

The API 145 is an interface used by the applications 147 to control a function provided from the kernel 141 or the middleware 143, and may include, for example, at least one interface or function (e.g., instruction) for file control, window control, image processing, text control, or the like.

For example, the input/output interface 150 may forward instructions or data, input from a user or an external device, to the other element(s) of the electronic device 101, or may output instructions or data, received from the other element(s) of the electronic device 101, to the user or the external device. For example, the input/output interface 150 may include a wired/wireless headset port, an external charger port, a wired/wireless data port, a memory card port, an audio input/output port, a video input/output port, an earphone port, and the like.

The display 160 may include, for example, a liquid crystal display (LCD), a light-emitting diode (LED) display, an organic light-emitting diode (OLED) display, an active matrix OLED (AMOLED), a micro electro-mechanical systems (MEMS) display, an electronic paper display, or the like. The display 160 may display, for example, various types of content (e.g., text, images, videos, icons, and/or symbols) for a user. The display 160 may include a touch screen, and may receive a touch, gesture, proximity, or hovering input using, for example, an electronic pen or the user's body part.

The display 160 may show, for example, visual output to a user. The visual output may be shown in the form of text, graphics, video, and a combination thereof. The display unit 160 may display (output) various types of information processed in the electronic device 101. For example, the display unit 160 may display a user interface (UI) or a graphic UI (GUI) related to the use of the electronic device 101. According to various embodiments, the display 160 may display various user interfaces (e.g., a UI or GUI) related to operations performed by the electronic device 101 (e.g., displaying content, generating a vibration, outputting a vibration, or the like).

According to various embodiments, the display 160 may include a flat display or a curved display (or a bent display) which may be warped, bent, or rolled without damage thereto thanks to the paper-thin and flexible substrate thereof. The curved display may maintain a shape in which the curved display is engaged with a housing (bezel or body) and is curved. According to various embodiments, the electronic device 101 may be implemented as a display device, such as a flexible display that may be freely folded and unfolded, as well as a curved display.

According to various embodiments, the display 160 may have foldable flexibility by replacing, with a plastic film, a glass substrate surrounding a liquid crystal of a liquid crystal display (LCD), a light-emitting diode (LED), an organic light-emitting diode (OLED), or an active matrix OLED (AMOLED). According to various embodiments, the display 160 may be extended up to at least one side of the electronic device 101 (e.g., at least one side of the left side, the right side, the top side, and the bottom side), and may be engaged with a side of the housing by being folded inwards by a value less than or equal to the radius of curvature (e.g., a radius of curvature of 5 cm, 1 cm, 7.5 mm, 5 mm, 4 mm or the like) that allows the curved display to operate.

The communication interface 170 may establish, for example, communication between the electronic device 101 and an external device (e.g., a first external electronic device 102, a second external electronic device 104, or a server 106). For example, the communication interface 170 may be connected to the network 162 via wireless communication or wired communication, and may communicate with an external device.

The wireless communication may include cellular communication which uses, for example, at least one of long-term evolution (LTE), LTE-advanced (LTE-A), code division multiple access (CDMA), wideband CDMA (WCDMA), universal mobile telecommunications system (UMTS), WiBro (wireless broadband), global system for mobile communications (GSM), or the like.

According to an embodiment, the wireless communication may include, for example, at least one of wireless fidelity (Wi-Fi), light fidelity (Li-Fi), wireless gigabit alliance (WiGig), Bluetooth, Bluetooth low energy (BLE), ZigBee, nearfield communication (NFC), magnetic secure transmission, radio frequency (RF), or a body area network (BAN), which is illustrated as an element 164 of FIG. 1.

According to an embodiment, the wireless communication may include a GNSS. The GNSS may be, for example, a global positioning system (GPS), a global navigation satellite system (GLONASS), a BeiDou navigation satellite system (hereinafter, referred to as "BeiDou"), or Galileo (the European global satellite-based navigation system). Hereinafter, in this document, "GPS" may be interchangeably used with "GNSS".

The wired communication may include, for example, at least one of a universal serial bus (USB), a high-definition multimedia interface (HDMI), recommended standard 232 (RS-232), or a plain old telephone service (POTS). The network 162 may include at least one of telecommunication networks, for example, a computer network (e.g., a local area network (LAN) or a wide area network (WAN)), the Internet, or a telephone network.

Each of the first external electronic device 102 and the second external electronic device 104 may be a device of a type which is the same as, or different from, that of the electronic device 101. According to various embodiments, all or some of the operations performed by the electronic device 101 may be performed by one or multiple external electronic devices (e.g., the electronic devices 102 and 104 or the server 106).

According to an embodiment, when the electronic device 101 has to perform a function or service automatically or in response to a request, the electronic device 101 may request another device (e.g., the electronic device 102 or 104, or the server 106) to perform at least some functions relating thereto, instead of autonomously performing the function or service or in addition to performing the function or service. Another electronic device (e.g., the electronic device 102 or 104, or the server 106) may execute the requested functions or the additional functions, and may deliver the result thereof to the electronic device 101. The electronic device 101 may provide the received result as it is, or may additionally process the received result to provide the requested functions or services. To this end, for example, cloud-computing technology, distributed computing technology, or client-server computing technology may be used.

The server 106 may include, for example, at least one of an integration server, a provider server (or a communication common carrier server), a content server, an internet server, a cloud server, a web server, a secure server, a certification server, or the like.

Figure 2:
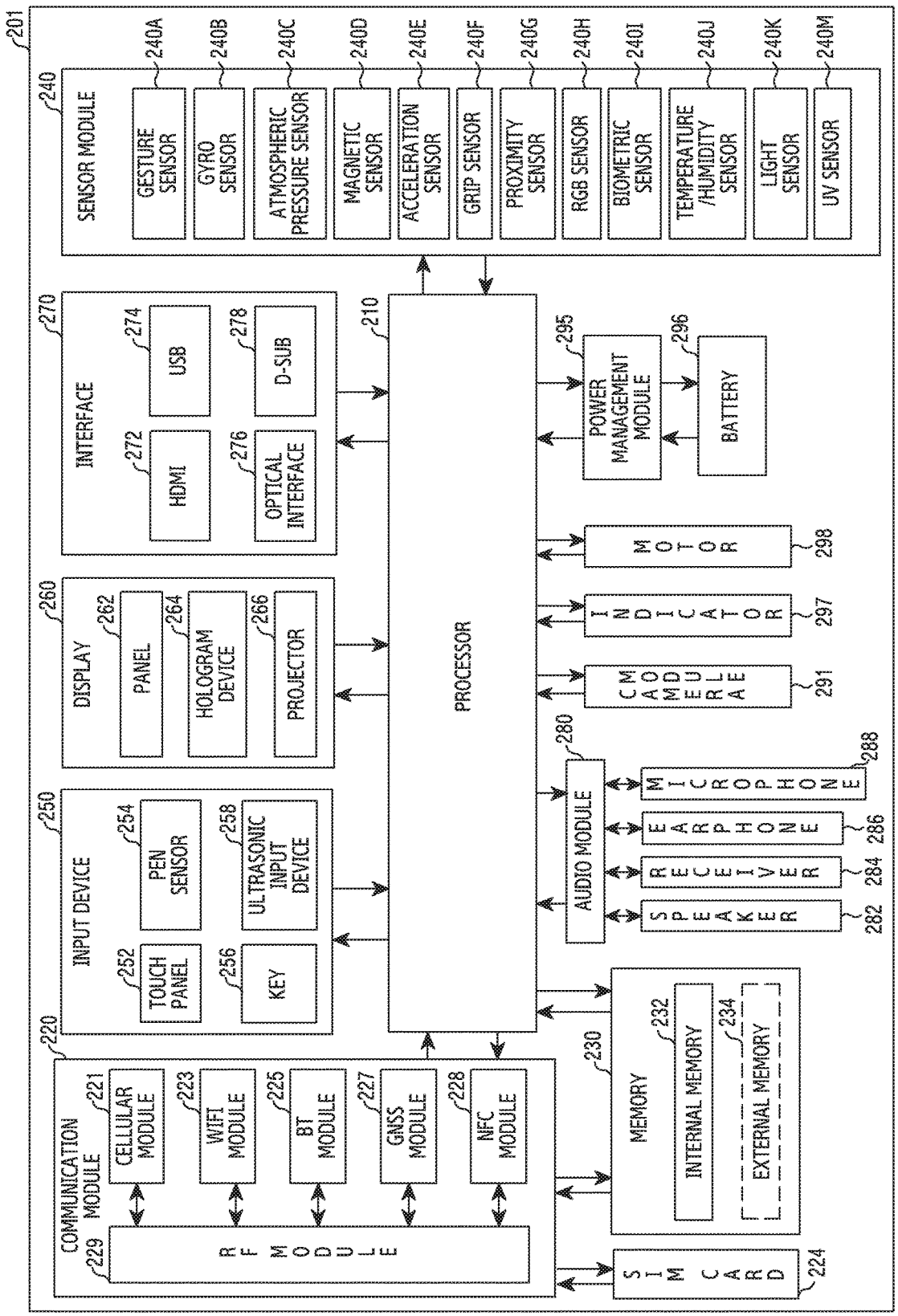
FIG. 2 is a block diagram of an electronic device according to various embodiments.

FIG. 2 is a block diagram of an electronic device according to various embodiments.

The electronic device 201 may include, for example, all or part of the electronic device 101 illustrated in FIG. 1. The electronic device 201 may include at least one processor 210 (e.g., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

According to various embodiments, since not all of the elements illustrated in FIG. 2 are necessary, the electronic device 201 may have more or fewer elements than those illustrated in FIG. 2. For example, the electronic device 201 according to various embodiments may not include some elements, depending on the type of electronic device. According to various embodiments, the elements of the electronic device 201 may be seated in the housing (or the bezel or the body) of the electronic device 201, or may be disposed outside the electronic device 201.

The processor 210 may drive, for example, an operating system or application programs to control a plurality of hardware or software elements connected thereto and to perform various types of data processing and operations. The processor 210 may be implemented as, for example, a system on chip (SoC). According to an embodiment, the processor 210 may further include a graphic processing unit (GPU) and/or an image signal processor (ISP).

The processor 210 may also include at least some of the elements illustrated in FIG. 2 (e.g., a cellular module 221). The processor 210 may load, in volatile memory, instructions or data received from at least one of the other elements (e.g., nonvolatile memory), may process the loaded instructions or data, and may store the resultant data in the nonvolatile memory.

According to various embodiments, the processor 210 may include one or more processors. For example, the processor 210 may include a communication processor (CP), an application processor (AP), an interface (e.g., general-purpose input/output: GPIO), or an embedded memory, either as separate elements or in a form integrated into one or more integrated circuits. According to an embodiment, the application processor may perform various functions for the electronic device 201 by executing several software programs, and the communication processor may perform processing and control for voice communication and data communication. The processor 210 may serve to execute a particular software module (e.g., an instruction set) stored in the memory 230 and perform various particular functions corresponding to the module.

According to various embodiments, the processor 210 may control the overall operation of the electronic device 201. According to various embodiments, the processor 210 may control the operation of a hardware module, such as an audio module 280, an interface 270, a display 260, a camera module 291, a communication module 220, a power management module 295, a sensor module 240, a motor 298, and the like. According to various embodiments, the processor 210 may be electrically connected to the display 260, the memory 230, and/or the motor 298 of the electronic device 201.

According to various embodiments, the processor 210 may process operations related to selecting multiple frequencies using a musical element, setting at least one vibration on the basis of the selected multiple frequencies, and generating a vibration pattern on the basis of the set vibration. According to various embodiments, the processor 210 may process operations related to selecting multiple frequencies within a frequency band supported by the motor 298, and determining respective vibrations corresponding to the multiple frequencies on the basis of at least a part of the musical element. According to an embodiment, the processor 210 may process operations related to recognizing a frequency for a vibration on the basis of user interaction using a user interface and generating a vibration. According to an embodiment, the processor 210 may process operations related to recognizing a frequency for a vibration from music selected by a user, and generating a vibration.

The processing (or controlling) operation by the processor 210 according to various embodiments will be described in detail with reference to drawings described later.

The communication module 220 may have a configuration the same as or similar to that of the communication interface 170 of FIG. 1. The communication module 220 may include, for example, a cellular module 221, a Wi-Fi module 223, a Bluetooth module 225, a GNSS module 227, an NFC module 228, and an RF module 229. Although not illustrated, the communication module 220 may further include a WiGig module (not illustrated). According to an embodiment, the Wi-Fi module 223 and the WiGig module (not illustrated) may be integrated into a single chip.

The cellular module 221 may provide, for example, a voice call, a video call, a text message service, an Internet service, or the like via a communication network. According to an embodiment, the cellular module 221 may identify and authenticate the electronic device 201 in the communication network using the subscriber identification module 224 (e.g., a subscriber identification module (SIM) card). According to an embodiment, the cellular module 221 may perform at least some of the functions that the processor 210 may provide. According to an embodiment, the cellular module 221 may include a communication processor (CP). In some embodiments, at least some (two or more) among the cellular module 221, the Wi-Fi module 223, the Bluetooth module 225, the GNSS module 227, and the NFC module 228 may be included in a single integrated chip (IC) or IC package.

The RF module 229 may transmit/receive, for example, a communication signal (e.g., an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the Bluetooth module 225, the GNSS module 227, and the NFC module 228 may transmit or receive an RF signal via a separate RF module.

The Wi-Fi module 223 may be, for example, a module for wireless Internet access and for establishing a wireless local area network (LAN) link with an external device (e.g., the electronic device 102, the server 106, or the like). The Wi-Fi module 223 may be mounted inside or outside the electronic device 201. Wireless Internet technologies may include Wi-Fi, WiGig, wireless broadband (WiBro), world interoperability for microwave access (WiMAX), high-speed downlink packet access (HSDPA), millimeter wave (mmWave), or the like. The Wi-Fi module 223 may be directly connected with the electronic device 201, or may interoperate with an external device (e.g., the electronic device 104 or the like) connected via a network (e.g., a wireless Internet network) (e.g., the network 104), so as to transmit various data of the electronic device 201 to the outside, or may receive various data from the outside. The Wi-Fi module 223 may always maintain the ON state, or may be turned on/turned off according to settings of the electronic device or in response to user input.

The Bluetooth module 225 and the NFC module 228 are examples of short-range communication modules for performing short-range communication. The short-range communication technologies may include Bluetooth, Bluetooth Low Energy (BLE), radio-frequency identification (RFID), infrared ray communication (IrDA), ultra-wideband (UWB), ZigBee, NFC, or the like. The short-range communication module may interoperate with an external device (e.g., the electronic device 102 or the like) connected to the electronic device 201 via a network (e.g., a short-range communication network), and may perform various kinds of data transmission or reception with the external device. The short-range communication module (e.g., the Bluetooth module 225 and the NFC module 228) may always maintain the ON state, or may be turned on/turned off according to settings of the electronic device 201 or user input.

The subscriber identification module 224 may include, for example, a card that includes a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, embedded memory 232 or external memory 234. The embedded memory 232 may include at least one of a volatile memory (e.g., a dynamic random access memory (DRAM), a synchronous RAM (SRAM), a synchronous dynamic RAM (SDRAM), and the like) and a nonvolatile memory (e.g., a one-time programmable read-only memory (OTPROM), a programmable ROM (PROM), an erasable and programmable ROM (EPROM), an electrically EPROM (EEPROM), a mask ROM, a flash ROM, a flash memory, a hard drive, a solid-state drive (SSD), and the like). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally or physically connected to the electronic device 201 via various interfaces.

The memory 230 may include one or more programs, data, or instructions related to operations in which the processor 210 selects multiple frequencies using a musical element in a frequency band supported by the motor 298, sets at least one vibration on the basis of the selected multiple frequencies, and generates a vibration pattern on the basis of the set vibration. According to various embodiments, the memory 230 may store one or more programs, data, or instructions related to operations in which the processor 210 processes operations of selecting multiple frequencies within a frequency band supported by the motor 298 and determining respective vibrations corresponding to the multiple frequencies on the basis of at least a part of the musical element.

According to various embodiments, the memory 230 may store a musical element, a frequency for a vibration according to a musical element (e.g., the standard frequency for each scale and octave listed in Table 1), and a vibration pattern generated based on frequencies associated with a musical element.

The memory 230 may include an expandable memory (e.g., the external memory 234) or an embedded memory (e.g., the embedded memory 232). The electronic device 201 may also operate using web storage, in which a storage function of the memory 230 is performed over the Internet.

The memory 230 may store one or more pieces of software (or software modules). For example, the software elements may include an operating system software module, a communication software module, a graphic software module, a user interface software module, a moving picture experts group (MPEG) module, a camera software module, or one or more application software modules. Further, since the module, which is the software element, may be a set of instructions, the module may also be referred to as an "instruction set". The module may also be a program. According to various embodiments of the disclosure, the memory 230 may include an additional module (instructions) as well as the above-described modules. Alternatively, the memory 230 may not use some modules (instructions) if unnecessary.

The operating system software module may include various software elements for controlling overall system operation. Controlling the overall system operation refers to, for example, managing and controlling the memory, controlling and managing storage hardware (device), or controlling and managing power. Further, the operating system software module may perform a function of smoothly supporting communication between various hardware (devices) and software elements (modules).

The communication software module may enable communication with another electronic device, such as a wearable device, a smart phone, a computer, a server, or a portable terminal or the like, via the communication module 220 or the interface 270. Further, the communication software module may be configured in a protocol structure corresponding to a corresponding communication scheme.

The graphic software module may include various software elements for providing and displaying graphics on the display 260. The term "graphics" is used to have a meaning including text, a web page, an icon, a digital image, a video, animation, and the like.

The user interface software module may include various software elements related to a user interface (UI). For example, the user interface software module may include content indicating how the state of the user interface is changed or indicating the conditions under which the change in the state of the user interface is made.

The MPEG module may include a software element which enables digital content (e.g., video and audio data)-related processes and functions (e.g., generation, reproduction, distribution, and transmission of content).

The camera software module may include a camera-related software element which enables camera-related processes and functions.

The application module may include a web browser including a rendering engine, email, instant messaging (instant message), word processing, keyboard emulation, an address book, a touch list, widgets, digital rights management (DRM), iris scanning (iris scan), context cognition, voice recognition, a position determining function, location-based service, and the like. According to various embodiments, an application module may include a health care application (measuring the amount of exercise, blood sugar, or the like), an environmental information provision application (e.g., atmospheric pressure, humidity, or temperature information), or the like. According to various embodiments, the application module may include one or more applications that perform an operation of generating and providing a related vibration on the basis of a musical element.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, a barometer sensor 240C, a magnetic sensor 240D, an acceleration sensor 240E, a grip sensor 240F, a proximity sensor 240G, a color sensor 240H (e.g., a Red/Green/Blue (RGB) sensor), a medical sensor 240I, a temperature-humidity sensor 240J, an illuminance sensor 240K, and an ultraviolet (UV) sensor 240M.

Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. In some embodiments, the electronic device 201 may further include a processor (e.g., a low-power processor, a microcontroller unit (MCU), a microprocessor unit (MPU), or the like) configured to control the sensor module 240 as a part of or separately from the processor 210, and may control the sensor module 240 while the processor 240 is in a sleep state.

The input device 250 may include, for example, a touch panel 252, a (digital) pen sensor 254, a key 256, or an ultrasonic input device 258.

The touch panel 252 may be, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, via a microphone (e.g., the microphone 288) and may identify data corresponding to the detected ultrasonic waves. According to various embodiments, the input device 250 may include an electronic pen. According to various embodiments, the input device 250 may be implemented to receive input of a force touch.

The display 260 (e.g., the display 160) may include a panel 262, a hologram device 264, a projector 266, and/or a control circuit for controlling the same.

The panel 262 may be implemented to be, for example, flexible, transparent, or wearable. The panel 262, together with the touch panel 252, may be configured as one or more modules. According to an embodiment, the panel 262 may include a pressure sensor (or a force sensor) which may measure the strength of pressure of a user's touch. The pressure sensor may be integrated with the touch panel 252, or may be implemented as one or more sensors separate from the touch panel 252.

The panel 262 may be seated in the display 260 and may detect user input of contact with or approach to the surface of the display 260. The user input may include a touch input or a proximity input, and may be a single touch, multiple touches, hovering, or an air gesture. According to various embodiments, the panel 262 may receive user input for initiating an operation related to the use of the electronic device 201 and generate an input signal based on the user input.

The panel 262 may be configured to convert a change in the pressure applied to a particular part of the display 260 or a change in the capacitance generated on a particular part of the display 260 into an electric input signal. The panel 262 may detect a location and an area on the surface of the display 260 that an input means (e.g., a user's finger or an electronic pen) touches. Further, the panel 262 may be implemented to detect even the pressure of a touch (e.g., a force touch) according to the applied touch scheme.

The hologram device 264 may show a three-dimensional image in the air using light interference. The projector 266 may display an image by projecting light onto a screen. The screen may be located, for example, in the interior of outside the electronic device 201.

The interface 270 may include, for example, an HDMI 272, a USB 274, an optical interface 276, or a D-subminiature (D-sub) interface 278. The interface 270 may be included in, for example, the communication circuit 170 illustrated in FIG. 1. Additionally or alternatively, the interface 270 may, for example, include a mobile high-definition link (MHL) interface, an SD card/multi-media card (MMC) interface, or an infrared data association (IrDA) standard interface.

The interface 270 may receive data or power from another electronic device and transmit the received data or power to each element within the electronic device 201. The interface 270 may enable the data inside the electronic device 201 to be transmitted to another electronic device. For example, the interface 270 may include a wired/wireless headset port, an external charger port, a wired/wireless data port, a memory card port, an audio input/output port, a video input/output port, an earphone port, and the like.

The audio module 280 may convert, for example, sound into an electrical signal, and vice versa. At least some elements of the audio module 280 may be included, for example, in the input/output interface 145 illustrated in FIG. 1.

The audio module 280 may process sound information that is input or output via, for example, a speaker 282, a receiver 284, earphones 286, the microphone 288, or the like. The audio module 280 may transmit an audio signal received from the processor 210 to an output device (e.g., the speaker 282, the receiver 284, or the earphone 286), and may deliver an audio signal, such as a voice or the like, input through an input device (e.g., the microphone 288) to the processor 210. The audio module 280 may convert voice/sound data to an audible sound via an output device according to the control of the processor 210 and may output the same, and may convert an audio signal, such as voice or the like, received from the input device, into a digital signal, and may transfer the same to the processor 210.

The speaker 282 or the receiver 284 may output audio data which is received from the communication module 220 or is stored in the memory 230. The speaker 282 or the receiver 284 may output a sound signal related to various operations (functions) performed by the electronic device 201. The microphone 288 may receive an external sound signal and process the sound signal into electric voice data. Various noise reduction algorithms may be implemented in the microphone 288 to remove noise generated in the process of receiving an external sound signal. The microphone 288 may be in charge of inputting an audio streaming such as a voice command or the like.

The camera module 291 is a device capable of capturing a still image and a video. According to an embodiment, the camera module 291 may include one or more image sensors (e.g., a front sensor or a rear sensor), a lens, an image signal processor (ISP), or a flash (e.g., an LED or xenon lamp).

According to various embodiments, the camera module 291 may be an element for supporting a photography function of the electronic device 201. The camera module 291 may photograph a subject under the control of the processor 210, and may transfer the photograph data (e.g., an image) to the display 260 and the processor 210.

According to various embodiments, the camera module 291 may include, for example, a first camera (e.g., a color (RGB) camera) for obtaining color information and a second camera (e.g., an infrared (IR) camera) for obtaining depth information (e.g., location information and distance information associated with a subject). According to an embodiment, the first camera may be a front camera disposed on the front side of the electronic device 201. According to various embodiments, the front camera may be replaced with the second camera, and the first camera may not be disposed on the front side of the electronic device 201. According to various embodiments, the first camera may be disposed on the front side of the electronic device 201 together with the second camera. According to an embodiment, the first camera may be a back camera disposed on the back side of the electronic device 201. According to an embodiment, the first camera may be provided in a form including both the front camera and the back camera disposed, respectively, on the front side and the back side of the electronic device 201.

The camera module 291 may include an image sensor. The image sensor may be implemented as a charge-coupled device (CCD) or a complementary metal-oxide semiconductor (CMOS).

The power management module 295 may manage, for example, the power of the electronic device 201. According to an embodiment, the power management module 295 may include a power management integrated circuit (PMIC), a charger IC, or a battery or fuel gauge (or a battery gauge). The PMIC may use a wired and/or wireless charging scheme. The wireless charging scheme may include, for example, a magnetic resonance scheme, a magnetic induction scheme, an electromagnetic wave scheme, or the like. The PMIC may further include an additional circuit for wireless charging, for example, a coil loop, a resonance circuit, a rectifier, or the like. The fuel gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (e.g., the processor 210) of the electronic device 201.

The motor 298 (e.g., a vibration motor) may convert an electric signal into a mechanical vibration, and may generate a vibration, a haptic effect, or the like. According to various embodiments, the electronic device 201 may include a motor-driving controller (not illustrated), and the motor 298 may operate according to the control of the motor-driving controller. According to an embodiment, the processor 210 may provide a signal related to generation of a vibration to the motor-driving controller, and the motor-driving controller may output a motor-driving signal corresponding to the signal received from the processor 210 to the motor 298. The motor 298 may operate on the basis of the motor-driving signal received from the motor-driving controller, and may generate a vibration.

According to various embodiments, the motor 298 may be a motor that supports a wide frequency band, thereby providing multiple frequencies (e.g., a vibration occurs on the basis of a plurality of frequencies). The above-described example will be descried with reference to FIG. 4.

Although various embodiments are described with reference to the motor 298, the disclosure is not limited thereto. For example, various embodiments may be implemented by a vibration-generating device (or module) that generates a vibration like the motor 298. The vibration-generating device may include, for example, a vibrator, an actuator, or a haptic generation device, in addition to the motor 298. According to various embodiments, an operation related to generating and causing a vibration according to various embodiments to be described later may be performed using one or more vibration-generating devices.

The electronic device 201 according to various embodiments may include a mobile TV support device (e.g., GPU) that can process media data according to a standard such as digital multimedia broadcasting (DMB), digital video broadcasting (DVB), MediaFlo™, or the like.

Each of the above-described elements described in the disclosure may be configured with one or more components, and the names of the corresponding elements may be changed on the basis of the type of electronic device. According to various embodiments, the electronic device (e.g., the electronic devices 101 and 201) may not include some elements, or may further include additional elements. Some elements may be coupled to constitute one entity, and the entity may perform the same functions as those of the corresponding elements before being coupled to each other.

Figure 3:
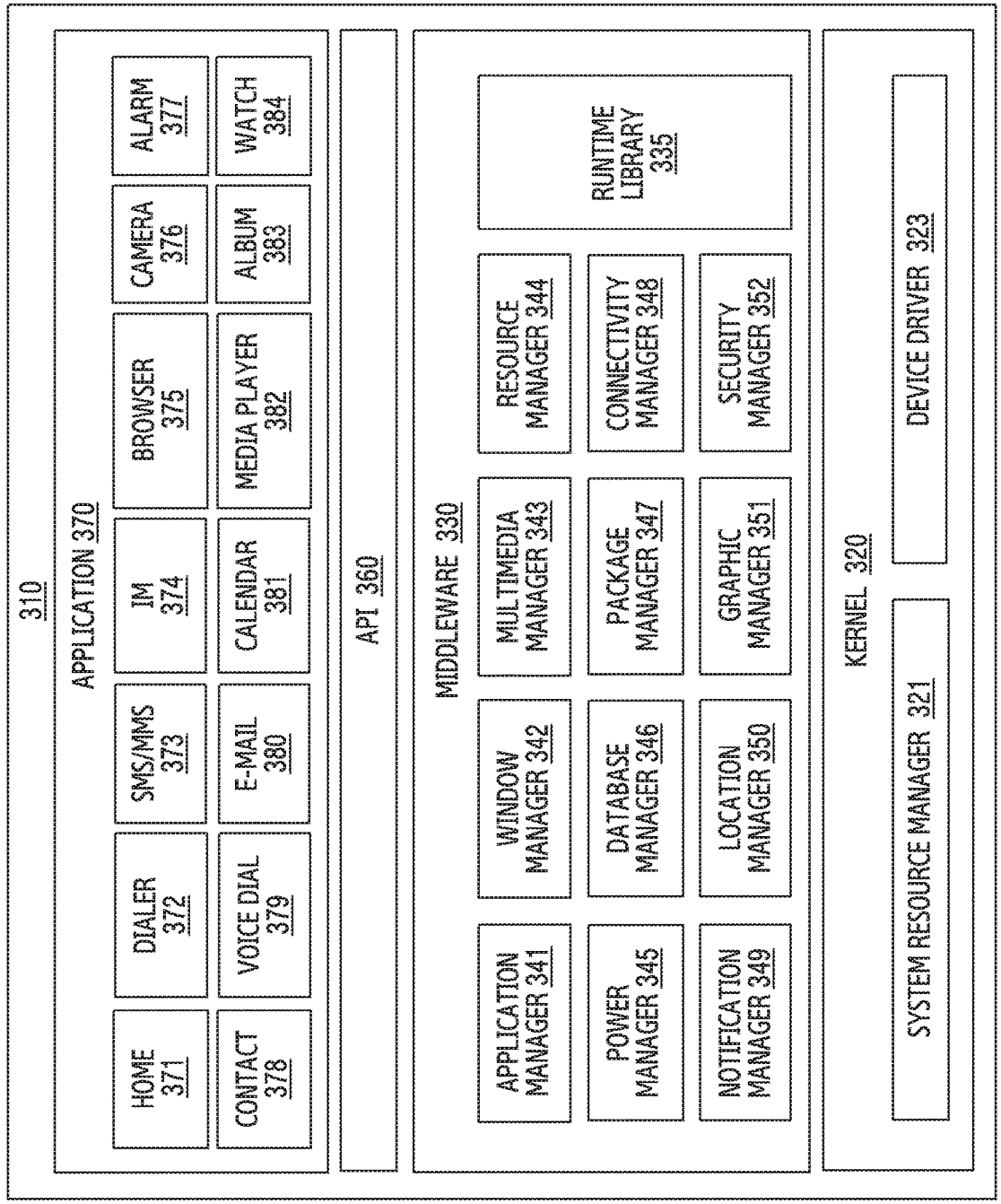
FIG. 3 is a block diagram of a program module according to various embodiments.

FIG. 3 is a block diagram of a program module according to various embodiments.

According to an embodiment, the program module 310 (e.g., the program 140) may include an operating system that controls resources relating to an electronic device (e.g., the electronic devices 101 and 201) and/or various applications (e.g., the application programs 147) that are driven on the operating system. The operating system may include, for example, Android™, iOS™, Windows™, Symbian™ Tizen™, or Bada™.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least a part of the program module 310 may be preloaded on the electronic device, or may be downloaded from an external electronic device (e.g., the electronic devices 102 and 104 or the server 106).

The kernel 320 may include, for example, a system resource manager 321 and/or a device driver 323.

The system resource manager 321 may control, allocate, or retrieve system resources. According to an embodiment, the system resource manager 321 may include a process manager, a memory manager, or a file-system manager.

The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function required by the applications 370 in common, or may provide various functions to the applications 370 via the API 360 such that the applications 370 can efficiently use the limited system resources within the electronic device.

According to an embodiment, the middleware 330 may include at least one of, for example, a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses in order to add a new function using a programming language while the applications 370 are running. The runtime library 335 may manage input/output, manage memory, or process an arithmetic function.

The application manager 341 may manage, for example, the life cycles of the applications 370. The window manager 342 may manage the GUI resources used for a screen.

The multimedia manager 343 may identify the formats required for reproducing various media files, and may encode or decode a media file using a codec suitable for a corresponding format. The resource manager 344 may manage the source code of the application 370 or the space in memory.

The power manager 345 may manage, for example, battery capacity, temperature, or power, and may determine or provide power information required for the operation of the electronic device using the corresponding information. According to an embodiment, the power manager 345 may interoperate with a basic input/output system (BIOS).

The database manager 346 may, for example, generate, search for, or change databases to be used by the applications 370. The package manager 347 may manage the installation or update of an application that is distributed in the form of a package file. The connectivity manager 348 may manage, for example, a wireless connection. The notification manager 349 may provide information associated with an event (e.g., an arrival message, an appointment, a proximity notification, or the like) to a user.

The location manager 350 may manage, for example, the location information of the electronic device. The graphic manager 351 may manage a graphic effect to be provided to a user and a user interface relating to the graphic effect. The security manager 352 may provide, for example, system security or user authentication.

According to an embodiment, the middleware 330 may include a telephony manager for managing a voice or video call function of the electronic device or a middleware module that is capable of forming a combination of the functions of the above-described elements. According to an embodiment, the middleware 330 may provide a module specified for each type of operating system. The middleware 330 may dynamically remove some existing elements, or may add new elements.

The API 360 is, for example, a set of API programming functions, and may be provided in different configurations depending on the operating system. For example, in the case of Android or iOS, one API set may be provided for each platform, and in the case of Tizen, two or more API sets may be provided for each platform.

The applications 370 may include applications, for example, home 371, a dialer 372, SMS/MMS 373, instant message (IM) 374, a browser 375, a camera 376, an alarm 377, contacts 378, a voice dialer 379, email 380, a calendar 381, a media player 382, a photo album 383, a watch 384, and the like. According to various embodiments, the applications 370 may include a health care application (measuring the amount of exercise or blood sugar), an environmental information provision application (atmospheric pressure, humidity, or temperature information), or the like. According to various embodiments, the applications 370 may include applications that perform an operation of generating and providing a related vibration on the basis of a musical element.

According to an embodiment, the applications 370 may include an information exchange application that can support the exchange of information between the electronic device and an external electronic device. The information exchange application may include, for example, a notification relay application for transferring specific information to an external electronic device or a device management application for managing an external electronic device.

For example, the notification relay application may relay notification information generated in the other applications of the electronic device to an external electronic device, or may receive notification information from an external electronic device and provide the received notification information to a user. The device management application may perform a function (e.g., a function of turning on/off an external electronic device (or some elements thereof) or controlling the brightness (or resolution) of the display) of the external electronic device communicating with the electronic device, or may install, delete, or update an application executed by the external electronic device.

According to an embodiment, the applications 370 may include applications (e.g., a health care application of a mobile medical appliance) that are designated according to the attributes of an external electronic device.

According to an embodiment, the applications 370 may include applications received from an external electronic device. At least some of the program module 310 may be implemented (e.g., executed) as software, firmware, hardware (e.g., the processor 210), or a combination of two or more thereof, and may include a module, a program, a routine, an instruction set, or a process for performing one or more functions.

The "module" may include a hardware unit, a software unit, or a firmware unit, and may be interchangeably used with, for example, the term "unit", "logic", "logic block", "component", or "circuit". The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by instructions which are stored in the form of a program module in a computer-readable storage medium (e.g., the memory 130 of FIG. 1 or the memory 230 of FIG. 2). The instructions, when executed by a processor (e.g., the processor 120 of FIG. 1 or the processor 210 of FIG. 2), may cause the processor to execute functions corresponding to the instructions.

The computer readable recoding medium may include a hard disk, a floppy disk, magnetic media (e.g., magnetic tape), optical media (e.g., compact disc read only memory (CD-ROM) and a digital versatile disc (DVD)), magneto-optical media (e.g., a floptical disk), an internal memory, and the like. The instructions may include a code which is made by a compiler or a code which can be executed by an interpreter. The programming module according to the disclosure may include one or more of the aforementioned elements or may further include other additional elements, or some of the aforementioned elements may be omitted.

According to various embodiments, a recording medium may include a computer-readable recording medium having a program recorded therein to execute various methods described below in the processor 120 or 210.

The operations performed by modules, programming modules, or other elements according to various embodiments may be performed in a sequential, parallel, repetitive, or heuristic manner, and some of the operations may be performed in different orders or omitted, or other operations may be added.

Figure 4:
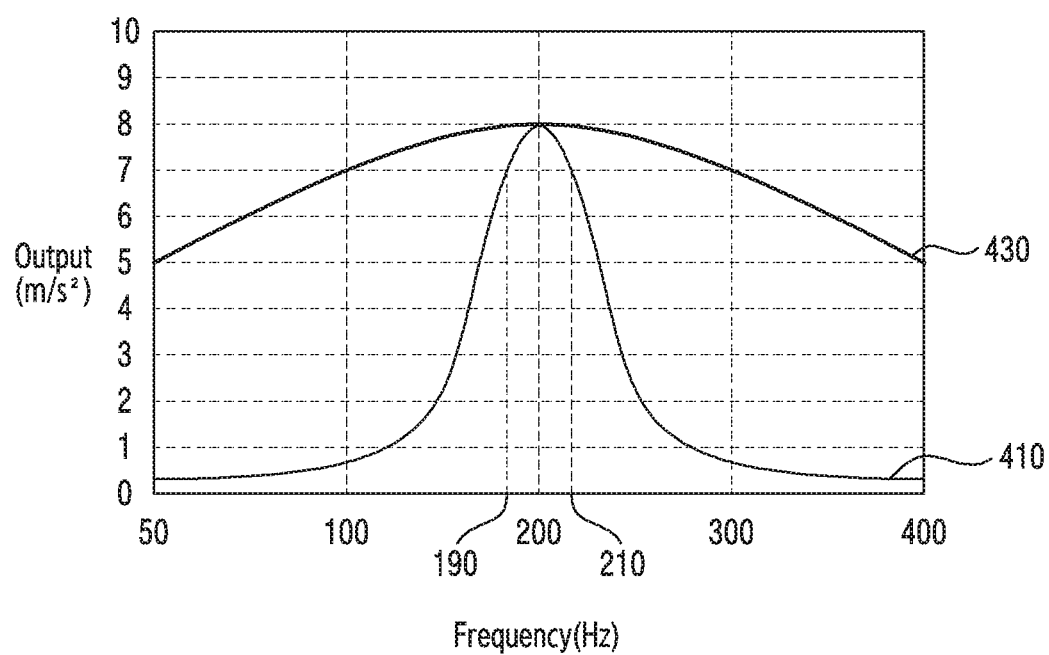
FIG. 4 is a diagram illustrating an operating frequency of a motor in an electronic device according to various embodiments.

FIG. 4 is a diagram illustrating the operating frequency of a motor in an electronic device according to various embodiments.

Referring to FIG. 4, the first waveform 410 of FIG. 4 is an example that illustrates a frequency band supported by a normal motor. A second waveform 430 is an example that illustrates a frequency band supported by a motor according to various embodiments. In FIG. 4, the horizontal axis (x axis) may indicate the frequency of the motor, and the vertical axis (y axis) may indicate the output (e.g., acceleration) of the motor.

In the case of a normal motor, a supportable frequency band may have, for example, a range of 190 Hz to 210 Hz, as shown in the example of the first waveform 410 of FIG. 4. Therefore, the normal motor may generate a single vibration based on a single frequency (or a resonant frequency, for example, the frequency with the highest intensity). Accordingly, since the supportable frequency band is narrow, the normal motor has difficulty in generating various vibrations based on multiple frequencies. The normal motor generates a simple vibration by controlling only the driving time, the driving direction, or the driving intensity.

In the case of a motor according to various embodiments, a supportable frequency band may have a range of 50 Hz to 400 Hz, or a range of 100 Hz to 300 Hz, or the like, according to an output (e.g., an acceleration of 5 m/s2 or more, an acceleration of 7 m/s2, or the like) designed for the motor, as shown in the example of the second waveform 430 of FIG. 4. Accordingly, in the case of the motor according to various embodiments, the same vibration or a plurality of different vibrations may be generated based on multiple frequencies (or resonant frequencies). Therefore, since the supportable frequency band is a wide band, the motor according to various embodiments may generate various vibrations based on multiple frequencies, may generate various vibrations by controlling a driving time, a driving direction, a driving speed, or a driving intensity in a combined manner for each vibration, and may provide a user with a vibration feedback with various representations (a melodic vibration with reality, realism, intuition, a sense of touch, or a sense of rhythm). For example, according to various embodiments, a driving signal of the motor may be generated on the basis of one or more frequencies in the multiple frequencies in the supportable frequency band, as opposed to fixedly applying a predetermined frequency when the motor is controlled.

Figure 5:
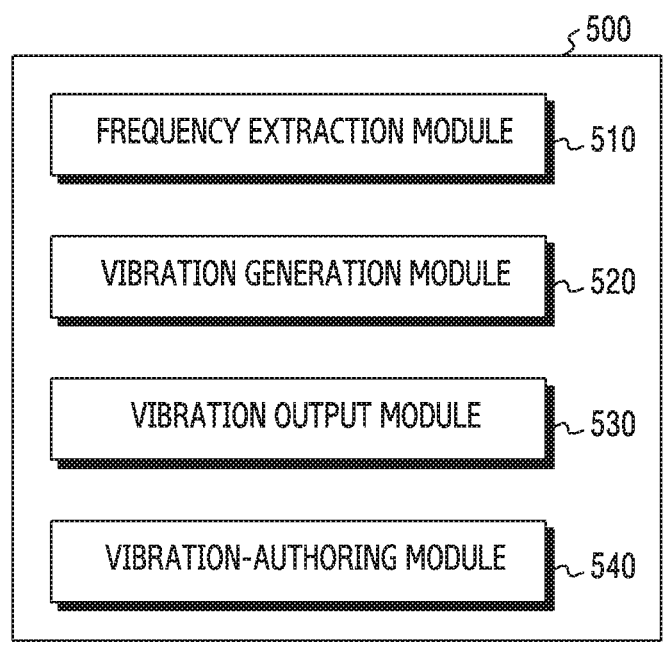
FIG. 5 is a diagram illustrating an example of a vibration-processing module in an electronic device according to various embodiments.

FIG. 5 is a diagram illustrating an example of a vibration-processing module in an electronic device according to various embodiments.

FIG. 5 illustrates an example of a vibration-processing module 500 that is related to generating and providing a related vibration on the basis of a musical element in an electronic device (e.g., the electronic device 101 and 201 of FIG. 1 or FIG. 2) according to various embodiments. According to various embodiments, the vibration-processing module 500 may be included in a processor (e.g., the processor 120 and 210 of FIG. 1 or FIG. 2 (hereinafter, the processor 210)) as a hardware module or a software module.

Referring to FIG. 5, the vibration-processing module 500 for generating and providing a vibration according to various embodiments may include a frequency extraction module 510, a vibration generation module 520, a vibration output module 530, a vibration-authoring module 540, and the like.

The frequency extraction module 510 may be a module for extracting or recognizing a frequency corresponding to a musical element. According to various embodiments, the musical element may include, for example, a tempo (beat), a length, repetition, a pitch, a scale, or the like. According to an embodiment, the musical scale (e.g., do, re, mi, fa, sol, la, ti, do, and the like) may have corresponding frequencies, as shown in the example of Table 1. In various embodiments, the frequency of a vibration corresponding to the frequency of a scale may be set. Table 1 shows an example of the standard frequency for each scale and octave. In Table 1, the frequency may be expressed in hertz (Hz).

TABLE 1

| scale | octave | | | | | | | |
|---|---|---|---|---|---|---|---|---|
| | 1 | 2 | 3 | 4 | 5 | 6 | 7 | 8 |
| C (do) | 32.7032 | 65.4064 | 130.8128 | 261.6256 | 523.2511 | 1046.502 | 2093.005 | 4186.009 |
| C# | 34.6478 | 69.2957 | 138.5913 | 277.1826 | 554.3653 | 1108.731 | 2217.461 | 4434.922 |
| D (re) | 36.7081 | 73.4162 | 146.8324 | 293.6648 | 587.3295 | 1174.659 | 2349.318 | 4698.636 |
| D# | 38.8909 | 77.7817 | 155.5635 | 311.1270 | 622.2540 | 1244.508 | 2489.016 | 4978.032 |
| E (mi) | 41.2034 | 82.4069 | 164.8138 | 329.6276 | 659.2551 | 1318.510 | 2637.020 | 5274.041 |
| F (fa) | 43.6535 | 87.3071 | 174.6141 | 349.2282 | 698.4565 | 1396.913 | 2793.826 | 5587.652 |
| F# | 46.2493 | 92.4986 | 184.9972 | 369.9944 | 739.9888 | 1479.978 | 2959.955 | 5919.911 |
| G (so) | 48.9994 | 97.9989 | 195.9977 | 391.9954 | 783.9909 | 1567.982 | 3135.963 | 6271.927 |
| G# | 51.9130 | 103.8262 | 207.6523 | 415.3047 | 830.6094 | 1661.219 | 3322.438 | 6644.875 |
| A (la) | 55.0000 | 110.0000 | 220.0000 | 440.0000 | 880.0000 | 1760.000 | 3520.000 | 7040.000 |
| A# | 58.2705 | 116.5409 | 233.0819 | 466.1638 | 932.3275 | 1864.655 | 3729.310 | 7458.620 |
| B (ti) | 61.7354 | 123.4708 | 246.9417 | 493.8833 | 987.7666 | 1975.533 | 3951.066 | 7902.133 |

According to various embodiments, the frequency extraction module 510 may extract a frequency on the basis of a musical element, in association with generating a vibration with a melody using the motor 298. According to an embodiment, in the case of at least a part "do do sol sol la la sol (CCGGAAG)" of music "Twinkle Twinkle Little Star", the frequency extraction module 510 may extract vibration frequencies corresponding to the frequencies of "do do sol sol la la sol (CCGGAAG)" from the frequency band supported by the motor 298. According to various embodiments, the frequency extraction module 510 may extract other frequencies associated with a pitch (or an octave) (e.g., ti ti fa# ti la fa#).

According to various embodiments, when extracting a frequency for a vibration frequency, the frequency extraction module 510 may perform extraction on the basis of frequencies corresponding to various inputs (or user interaction).

According to an embodiment, a musical element for a vibration frequency may be provided on the basis of a predetermined music (or melody), and the frequency extraction module 510 may extract a vibration frequency from each frequency of music in a predetermined music (or melody). According to an embodiment, the frequency extraction module 510 may extract a frequency corresponding to a touch input on a designated area in order to select a frequency, as a vibration frequency, on the basis of interaction with a user using a user interface. According to an embodiment, the frequency extraction module 510 may extract a frequency corresponding to the strength of a pressure of a force touch, as a vibration frequency, on the basis of interaction with a user using a user interface. According to an embodiment, the frequency extraction module 510 may extract a frequency corresponding to voice (or audio) of a voice input or an audio input provided by a user using an audio input device, such as a microphone or the like, as a vibration frequency.

The vibration generation module 520 may be a module for generating a vibration corresponding to a frequency on the basis of a musical element. According to an embodiment, the vibration generation module 520 may generate a vibration on the basis of a vibration frequency extracted by the frequency extraction module 510. According to various embodiments, the vibration generation module 520 may generate a vibration so as to have a different tempo and length on the basis of a musical element (e.g., a tempo (beat), a length, repetition, and the like) for each vibration. According to an embodiment, the vibration generation module 520 may represent the feel of a vibration and may generate a unique pattern using multiple vibrations corresponding to multiple frequencies, and may improve user recognition of notification. For example, on the basis of a vibration based on two or more consonant frequencies, a vibration with rhythm on the basis of the two to three consonant frequencies may be provided to a user. As another example, transmissibility of a warning may be increased using two or more frequencies (or variations) with low consonance, and information associated with a warning, an error, or the like may be provided in an intuitive manner. According to various embodiments, the vibration generation module 520 may generate a vibration pattern on the basis of each vibration and may store the same in the memory 230.

The vibration output module 530 may be a module for outputting a vibration with a melody (e.g., a melodic vibration) corresponding to a musical element. According to an embodiment, the vibration output module 530 may generate a vibration with various representations (e.g., a melodic vibration with reality, realism, intuition, a sense of touch, or rhythm) by distinguishing a tempo (beat), a length, a direction, a speed, or an intensity, according to a vibration pattern generated based on a musical element. According to an embodiment, the vibration output module 530 may convert notes in a scale into chord frequencies, and may map the converted chord frequencies to consonance or dissonance, so as to generate a vibration.

According to an embodiment, when an event related to output of a vibration from the inside or the outside is detected, the vibration output module 530 may generate a vibration corresponding to consonance or dissonance on the basis of a frequency associated with the event. For example, according to various embodiments, a consonant vibration may be generated or a dissonant vibration may be generated depending on a predetermined situation.

According to various embodiments, generating a vibration on the basis of a musical element and providing a related vibration feedback will be described with reference to drawings.

The vibration-authoring module 540 may be a module for processing an operation related to configuration of a vibration pattern by a user on the basis of a musical element. According to various embodiments, the vibration-authoring module 540 may process provision of a user interface for supporting vibration authoring by a user and generating a vibration on the basis of interaction with a user using a user interface. For example, the vibration-authoring module 540 may detect user input via a user interface, and may set an operating frequency, a length, a tempo, an intensity, or the like on the basis of the user input. Vibration authoring by the vibration-authoring module 540 will be described in detail with reference to drawings.

As described above, an electronic device according to various embodiments may include the display 160 and 260, a vibration-generating device (e.g., the motor 298), and the processor 120 and 210 functionally connected to the display and to the vibration-generating device. The processor may be configured to select multiple frequencies using a musical element, to set at least one vibration on the basis of the selected multiple frequencies, and to generate a vibration pattern on the basis of the set vibration.

According to various embodiments, the vibration-generating device may support a wide frequency band, and may include at least one of a motor, a vibrator, an actuator, or a haptic generation device.

According to various embodiments, the multiple frequencies may be a plurality of frequencies, which are included in a frequency band supported by the vibration-generating device, and which are the same as or different from each other.

According to various embodiments, the processor may be further configured to set a first vibration corresponding to a first frequency among the multiple frequencies, to set a second vibration corresponding to a second frequency among the multiple frequencies, and to generate a vibration pattern by combining the first vibration and the second vibration.

According to various embodiments, the processor may be further configured to determine the vibration corresponding to the selected multiple frequencies on the basis of at least a part of the musical element.

According to various embodiments, the processor is further configured to select the multiple frequencies on the basis of user interaction. The user interaction may include at least one of a touch input to a designated area, a force touch input using the strength of a pressure, or an audio (or voice) input.

According to various embodiments, the processor may be further configured to recognize a musical element from selected music, and to select the multiple frequencies.

According to various embodiments, the processor may be further configured to generate the vibration pattern by setting at least one of a length, a section, an intensity, or a speed with respect to each of the first vibration and the second vibration.

According to various embodiments, the same frequency or different frequencies are set for the first vibration and the second vibration, the first vibration and the second vibration at least partially overlap, or the first vibration and the second vibration are independently distinguished on the basis of their lengths.

According to various embodiments, the processor may be configured to detect an event (e.g., an internal event or an external event) related to output of a vibration, and to output a vibration based on a combination of multiple frequencies associated with consonance or dissonance according to the event.

Hereinafter, an operation method according to various embodiments of the disclosure will be described with reference to attached drawings. However, since the various embodiments are not restricted or limited by the following description, it should be noted that changes can be made to the various embodiments based on embodiments that will be described below. Hereinafter, various embodiments of the disclosure will be described based on an approach using hardware. However, various embodiments of the disclosure include technology that uses both hardware and software, and thus the various embodiments of the disclosure may not exclude the perspective of software.

Figure 6:
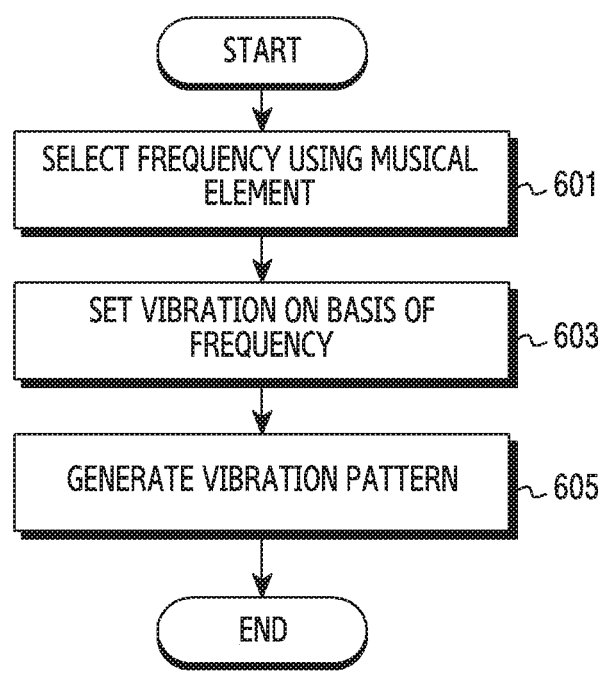
FIG. 6 is a flowchart illustrating an operation method of an electronic device according to various embodiments.

FIG. 6 is a flowchart illustrating an operation method of an electronic device according to various embodiments.

Referring to FIG. 6, in operation 601, a processor (e.g., one or more processors including a processing circuitry) (e.g., the processor 120 and 210 of FIG. 1 or FIG. 2, hereinafter, the processor 210) of an electronic device (e.g., the electronic device 101, 201, 102, and 104 of FIG. 1 or FIG. 2) may select a frequency using a musical element. According to various embodiments, the musical element may include, for example, a tempo (beat), a length, repetition, a pitch, a scale, or the like. According to an embodiment, the processor 210 may select one or more frequencies on the basis of at least a part of the musical element (e.g., a scale, a pitch, or the like).

In operation 603, the processor 210 may set a vibration on the basis of the selected frequency. According to an embodiment, the processor 210 may sequentially set a vibration according to selection of a frequency. For example, the processor 210 may set a first vibration in response to selection of a first frequency, and may set a second vibration in response to selection of a second frequency. According to an embodiment, the processor 210 may simultaneously set a vibration for each frequency in response to selection of a plurality of frequencies. According to various embodiments, when setting a vibration, the processor 210 may set each variation to be different from each other on the basis of at least a part of the musical element (e.g., a tempo, a length, a pitch, and the like).

In operation 605, the processor 210 may generate a vibration pattern on the basis of at least one set vibration. According to an embodiment, the processor 210 may generate a single vibration pattern by combining the first vibration of the first frequency and the second vibration of the second frequency, and may store the generated vibration pattern in the memory 230.

Figure 7:
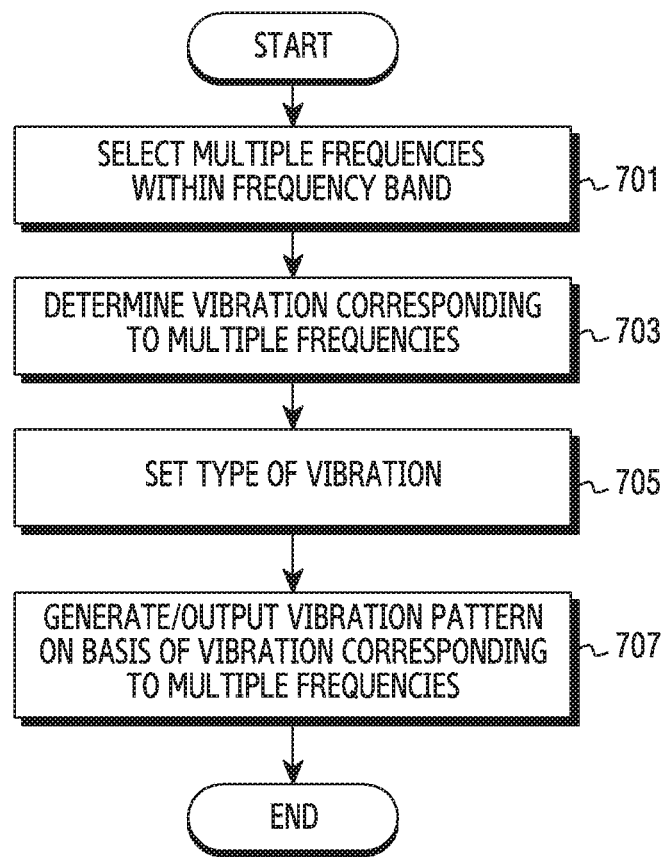
FIG. 7 is a flowchart illustrating an operation method of an electronic device according to various embodiments.

FIG. 7 is a flowchart illustrating an operation method of an electronic device according to various embodiments.

Referring to FIG. 7, in operation 701, the processor 210 of the electronic device may select multiple frequencies in a frequency band supported by the motor 298. According to an embodiment, the processor 210 may select multiple frequencies on the basis of a user input. For example, a user may perform interaction related to generation of a vibration using a user interface displayed in a display (e.g., the display 160 and 260 of FIG. 1 or FIG. 2), and the processor 210 may recognize a corresponding frequency on the basis of interaction with the user. According to various embodiments, the processor 210 may select multiple frequencies on the basis of a predetermined musical element. For example, the user may select (or designate) a predetermined music, and the processor 210 may recognize a melody (e.g., a musical element) from the designated music and may select multiple corresponding frequencies.

In operation 703, the processor 210 may determine a vibration corresponding to the multiple frequencies. According to an embodiment, the processor 210 may determine a first vibration corresponding to a first frequency, and may determine a second vibration corresponding to a second frequency.

In operation 705, the processor 210 may set a vibration type (e.g., a vibration length, a vibration section, a vibration repetition, and the like). According to an embodiment, the processor 210 may set a vibration length, a vibration section, a vibration intensity, or a vibration speed for each of the first vibration and the second vibration. According to various embodiments, the processor 210 may set the vibration length, the vibration section, the vibration repetition, or the like of each of the first vibration and the second vibration on the basis of a musical element (e.g., a tempo (beat), a length, a pitch, or the like). According to various embodiments, different frequencies may be set for the first vibration and the second vibration, the sections of the first vibration and the second vibration may at least partially overlap, or the first vibration and the second vibration may be independently distinguished depending on their vibration lengths. Accordingly, a description thereof will be provided with reference to the drawings.

In operation 707, the processor 210 may generate and/or output a vibration pattern on the basis of the multiple vibrations corresponding to the multiple frequencies. According to an embodiment, in the vibration authoring mode, the processor 210 may process generation of a single vibration pattern on the basis of the first vibration and the second vibration and storage of the vibration pattern in the memory 230. According to an embodiment, in the vibration output mode, the processor 210 may perform processing such that a melodic vibration is output on the basis of the first vibration and the second vibration.

Figure 8A:
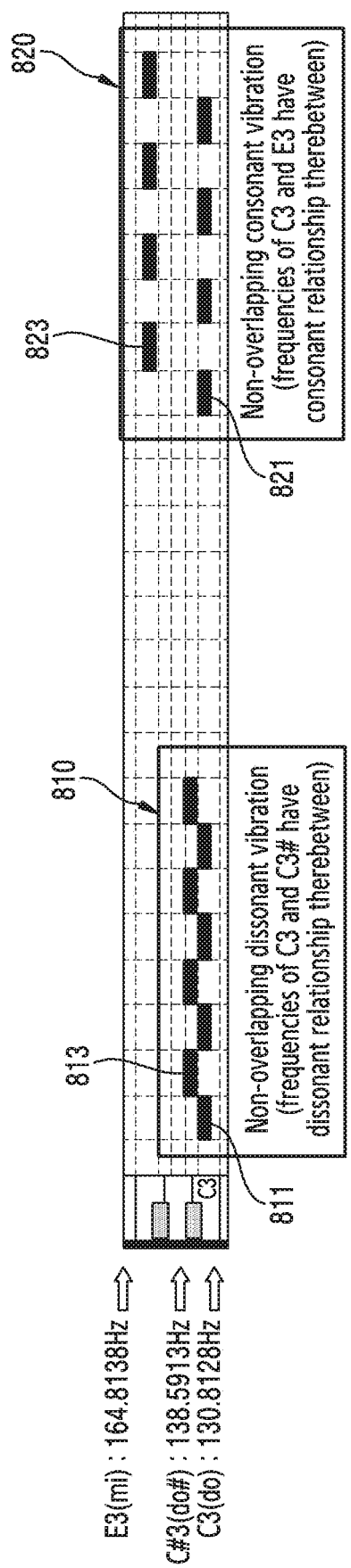
FIG. 8A is a diagram illustrating an example of generation of a vibration in an electronic device according to various embodiments.
Figure 8B:
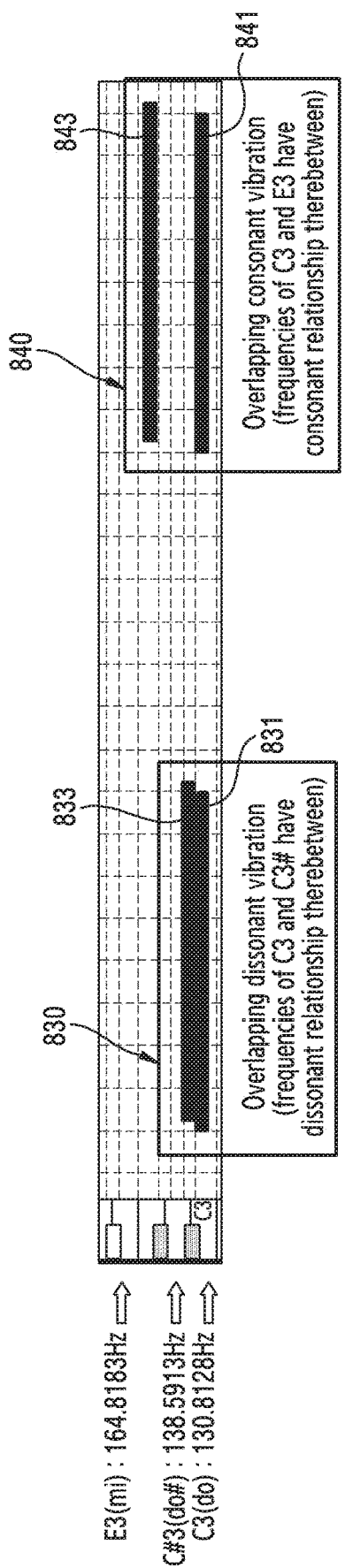
FIG. 8B is a diagram illustrating an example of generation of a vibration in an electronic device according to various embodiments.

FIGS. 8A and 8B are diagrams illustrating examples of generation of a vibration in an electronic device according to various embodiments.

As illustrated in FIGS. 8A and 8B, FIGS. 8A and 8B illustrate examples of setting a vibration based on consonance/dissonance for each of the various functions (a phone call, a notification, and the like) of the electronic device, using a musical element (e.g., a pitch, a scale, a frequency, or the like in the electronic device.

According to various embodiments, "consonance" may indicate a combination of two or more sounds that harmonize with each other. For example, a combination of a first natural note (e.g., do) and a second natural note (e.g., mi) may correspond to consonance in FIGS. 8A and 8B. For example, major intervals, perfect intervals, or the like corresponding to white keys of a piano may be included in consonance. According to an embodiment, "dissonance" indicates a combination of two or more sounds that do not harmonize with each other, and create harshness. For example, a combination of a natural note (e.g., do) and a sharp note (e.g., do#) may correspond to dissonance. For example, diminished intervals, minor intervals, augmented intervals, or the like, corresponding to black keys of a piano, may correspond to dissonance.

Referring to FIG. 8A, FIG. 8A illustrates an example of a consonance/dissonance vibration configuration of a discontinuous vibration, wherein respective vibrations do not overlap each other. For example, in FIG. 8A, a first example 810 illustrates an example of the configuration of a non-overlapping dissonant vibration. A second example 820 illustrates an example of the configuration of a non-overlapping consonant vibration.

According to an embodiment, as illustrated in the first example 810, a first vibration 811 is set on the basis of a frequency (e.g., 130.8128 Hz) corresponding to a first frequency (e.g., a C note (C3)). A second vibration 813 is set on the basis of a frequency (e.g., 138.5913 Hz) corresponding to a second frequency (e.g., a C sharp note (C#3)). According to an embodiment, as illustrated in the second example 820, a first vibration 821 is set on the basis of a frequency (e.g., 130.8128 Hz) corresponding to a first frequency (e.g., a C note (C3)). A second vibration 823 is set on the basis of a frequency (e.g., 164.8138 Hz) corresponding to a third frequency (e.g., an E note (E3)).

As illustrated in FIG. 8A, the first vibration 811 or 821 and the second vibration 813 or 823, set on the basis of different frequencies, may operate independently in different sections (a non-overlapping operation).

According to various embodiments, the first vibration 811 or 821 and the second vibration 813 or 823 may be set to be repeated according to their lengths. For example, referring to the first example 810, the first vibration 811 may have a length of X and may be repeated at intervals of N sections (N being, for example, an odd number (i.e., a natural number)). The second vibration 813 may have a length of Y and may be repeated at intervals of M sections (M being, for example, an even number (i.e., a natural number)). According to various embodiments, X and Y, which indicate length, may have the same values or may have different values. According to various embodiments, a length may be set to be different for each section or in some sections within a single vibration. For example, in the case of the first vibration 811, a vibration based on a frequency may be set to have a different length for each output section. For example, a length of X is set for a first section, a length of X+1 is set for a third section, a length of X is set for a fifth section, a length of X+2 is set for a seventh section, or the like.

According to various embodiments, the length of a vibration may be set on the basis of a section, as shown in FIG. 8A. That is, "length of a vibration" and "section of a vibration" may have the same meaning. According to an embodiment, a section may be set to the length of a vibration, a half of a section may be set to the length of a vibration, or a plurality of successive sections may be set to the length of a vibration.

FIG. 8B illustrates an example of a consonance/dissonance vibration configuration of a continuous vibration, wherein vibrations may partially overlap each other. For example, in FIG. 8B, a third example 830 illustrates an example of the configuration of an overlapping dissonant vibration. A fourth example 840 illustrates an example of the configuration of an overlapping consonant vibration.

According to an embodiment, as illustrated in the third example 830, a first vibration 831 is set on the basis of a frequency (e.g., 130.8128 Hz) corresponding to a first frequency (e.g., a C note (C3)). A second vibration 833 is set on the basis of a frequency (e.g., 138.5913 Hz) corresponding to a second frequency (e.g., a C sharp note (C#3)). According to an embodiment, as illustrated in the fourth example 840, a first vibration 841 is set on the basis of a frequency (e.g., 130.8128 Hz) corresponding to a first frequency (e.g., a C note (C3)). A second vibration 843 is set on the basis of a frequency (e.g., 164.8138 Hz) corresponding to a third frequency (e.g., an E note (E3)).

As illustrated in FIG. 8B, the first vibration 831 or 841 and the second vibration 833 or 843, set on the basis of different frequencies, may include an attribute of a continuous vibration (e.g., a vibration continuing during multiple sections), and may operate by overlapping in at least some sections (e.g., an overlapping operation).

According to various embodiments, the first vibration 831 or 841 and the second vibration 833 or 843 may be set to have respective lengths. For example, referring to the third example 830, the first vibration 831 may be set to have a length of X (e.g., a plurality of successive sections), and the second vibration 833 may be set to have a length of Y (e.g., a plurality of successive sections). According to various embodiments, X and Y, which indicate length, may have the same values or may have different values. According to various embodiments, since the first vibration 831 and the second vibration 833 are set to have long lengths, at least some sections may overlap according to the start point and/or the length of each vibration, and may simultaneously exist during at least some sections.

According to various embodiments, as illustrated in FIGS. 8A and 8B, on the basis of a combination of different frequencies (e.g., a first frequency and a second frequency, or a first frequency and a third frequency), the combination of a first vibration and a second vibration may be generated as a vibration pattern based on consonance or dissonance. For example, according to various embodiments, a vibration with harmony or a sense of stability may be provided to a user using vibrations corresponding to a combination of consonant frequencies. As another example, according to various embodiments, a vibration with disharmony or a sense of instability may be provided to a user using vibrations corresponding to a combination of dissonant frequencies.

FIGS. 9A to 9D are diagrams illustrating examples of providing a vibration in an electronic device according to various embodiments.

Referring to FIGS. 9A to 9D, as described in the description provided with reference to FIGS. 8A to 9D, FIGS. 9A to 9D illustrate examples of utilizing a vibration generated on the basis of multiple vibrations based on multiple frequencies associated with a musical element.

Figure 9B:
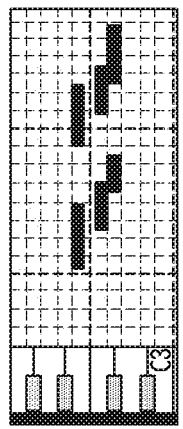
FIG. 9B is a diagram illustrating an example of providing a vibration in an electronic device according to various embodiments.
Figure 9D:
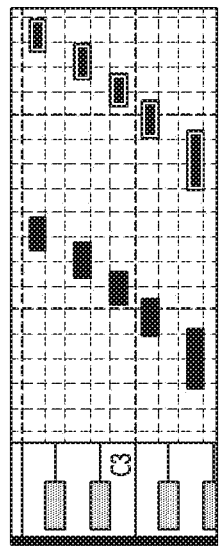
FIG. 9D is a diagram illustrating an example of providing a vibration in an electronic device according to various embodiments.
Figure 9A:
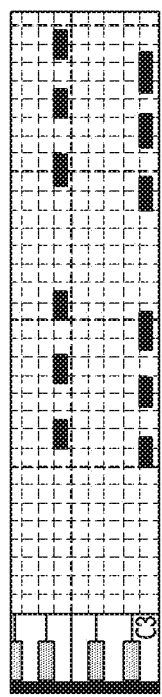
FIG. 9A is a diagram illustrating an example of providing a vibration in an electronic device according to various embodiments.

According to an embodiment, FIG. 9A illustrates an example of setting a call reception vibration using at least two consonant frequencies. For example, a ringtone (ringerbell) configured with two or three consonant frequencies may be provided using a vibration based on at least two consonant frequencies, as opposed to a typical ringtone. Accordingly, a vibration feedback which improves user recognition or intuition may be provided depending on user experience.

According to an embodiment, FIG. 9B illustrates an example of setting an error vibration using at least two dissonant frequencies. For example, using a vibration based on at least two dissonant frequencies, notification of an error (or a malfunction) in an electronic device may be provided in an intuitive manner.

Figure 9C:
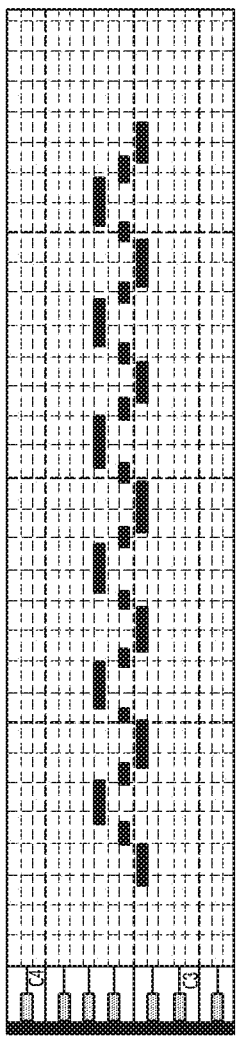
FIG. 9C is a diagram illustrating an example of providing a vibration in an electronic device according to various embodiments.

According to an embodiment, FIG. 9C illustrates an example of setting a dynamic vibration (e.g., a vibration with a large variation) using at least three consonant/dissonant frequencies. FIG. 9D illustrates an example of setting a unique vibration for a user or a vibration that a user can easily identify using at least five consonant/dissonant frequencies. As described above, according to various embodiments, the electronic device may configure a variation with a unique pattern and a feel of variation that is more dynamic (a vibration with a large variation) compared to a vibration based on a single frequency, which may thus help a user to improve recognition of a notification.

FIGS. 10A to 11B are diagrams illustrating examples of generation of a vibration in an electronic device according to various embodiments.

FIGS. 10A to 11B illustrate examples of setting a vibration based on consonance/dissonance for each of the various functions (e.g., a dissonance warning, a logic variation (e.g., a vibration for a cognition assist element)) of the electronic device, using a musical element (e.g., a pitch, a scale, a frequency, or the like in the electronic device.

Figures 10A, 10B:
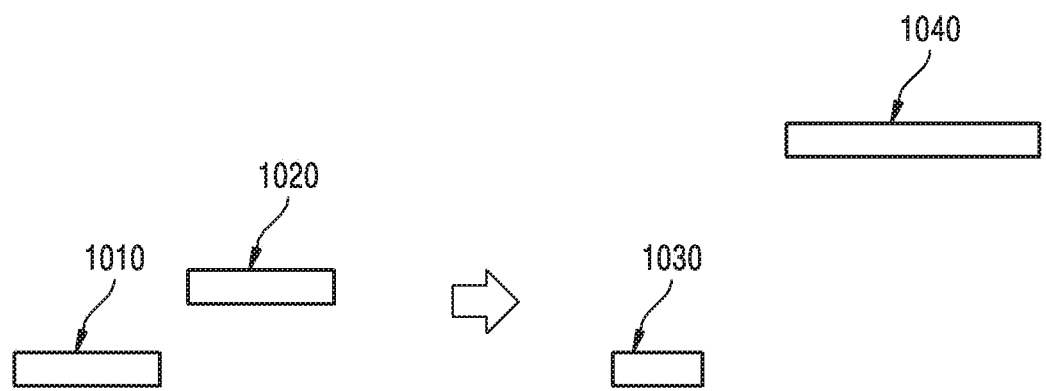
FIG. 10A is a diagram illustrating an example of generation of a vibration in an electronic device according to various embodiments.
FIG. 10B is a diagram illustrating an example of generation of a vibration in an electronic device according to various embodiments.

Referring to FIGS. 10A to 10B, FIGS. 10A to 10B illustrate an example of the configuration of a vibration for improving user's discernment for a notification based on a vibration.

For example, a vibration of FIG. 10A configured with a first vibration 1010 of a first frequency and a second vibration 1020 of a second frequency may be changed to correspond to the feature of a notification by adjusting the frequency (octave) and/or length of each vibration. According to an embodiment, as illustrated in FIG. 10B, the first vibration 1010 may be changed to a third vibration by reducing a length. The second vibration 1020 may be changed to a fourth vibration 1040 by changing the frequency to an upper frequency of the same note (e.g., a frequency corresponding to the same note with a higher octave) and by extending a length. According to an embodiment, cognition on the basis of hearing using an auditory user interface (AUI) logic may be easier than cognition on the basis of a vibration frequency (or pitch). Therefore, as shown in FIG. 10B, the user's discernment of vibration feedback can be improved using frequencies (or pitches) having a large difference therebetween.

Figure 11A:
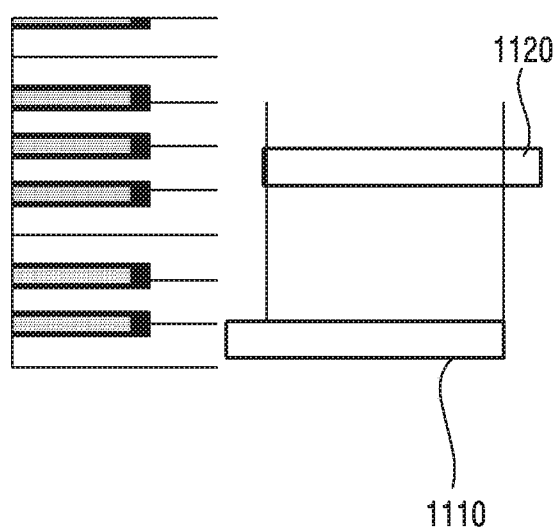
FIG. 11A is a diagram illustrating an example of generation of a vibration in an electronic device according to various embodiments.
Figure 11B:
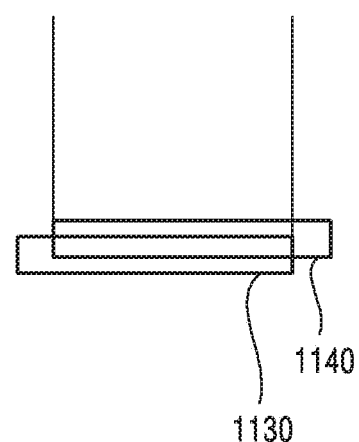
FIG. 11B is a diagram illustrating an example of generation of a vibration in an electronic device according to various embodiments.

FIGS. 11A to 11B illustrate another example of the configuration of a vibration for improving user's discernment of vibration. For example, FIGS. 11A to 11B illustrate an example of distinguishing a vibration feedback with a positive feeling and a vibration feedback with a negative feeling on the basis of a vibration generated on the basis of an overlap of consonant frequencies and dissonant frequencies.

According to an embodiment, as shown in FIG. 11A, using a combination of frequencies having a consonant relationship therebetween (e.g., a consonance frequency and a consonance frequency), a first vibration 1110 and a second vibration 1120 may be set respectively, and a vibration with a positive feeling may be generated on the basis of the first vibration 1110 and the second vibration 1120. For example, a first vibration and a second vibration may be configured respectively using a first frequency and a second frequency, which are frequencies having a consonant relationship therebetween, and a single vibration pattern may be configured in which the first vibration and the second vibration are configured to overlap or not to overlap each other.

According to an embodiment, as shown in FIG. 11B, using a combination of frequencies having a dissonant relationship therebetween (e.g., a consonant frequency and a dissonant frequency, or a dissonant frequency and a dissonant frequency), a first vibration 1130 and a second vibration 1140 may be respectively set, and a vibration with a negative feeling may be generated on the basis of the first vibration 1130 and the second vibration 1140. For example, a first vibration and a second vibration may be configured respectively using a first frequency corresponding to consonance and a second frequency corresponding to dissonance, and a single vibration pattern may be configured in which the first vibration and the second vibration are configured to overlap or not to overlap each other.

According to an embodiment, an example of notifying a user of a warning on the basis of a vibration can be considered. The existing vibration scheme based on a single frequency may be a scheme of conveying, to a user, the urgency of the warning using only variation in the period and/or the intensity of vibration. Conversely, according to various embodiments, the urgency of the warning may be distinctively transmitted to a user using a complex variation based on consonance/dissonance of multiple frequencies. For example, a vibration feedback may be provided to a user with a vibration corresponding to frequencies with low consonance, for example, dissonant frequencies. Therefore, according to various embodiments, an additional notification vibration may be provided using at least two frequencies (or a variation thereof) with low consonance, in addition to variation of the period and/or intensity of an existing single frequency. Through the above, transmissibility based on vibration may be improved, and urgent or negative information such as a warning or an error may be distinctively transferred to a user.

FIGS. 12A to 13 are diagrams illustrating examples of providing a vibration in an electronic device according to various embodiments.

FIGS. 12A to 13 illustrate examples of utilizing a vibration generated using multiple vibrations based on multiple frequencies associated with a musical element, for each function of the electronic device, as illustrated in the description provided with reference to FIGS. 10A to 11B.

FIGS. 12A to 12B illustrate an example of providing a vibration using a feeling of musical harmony. For example, a vibration may be provided using a feel (e.g., soft)/phonetic value (time value) of a low frequency/high frequency.

According to an embodiment, FIG. 12A illustrates an existing vibration provision scheme, which is a scheme of outputting a vibration by turning on/off a single vibration, such as a Morse code scheme.

According to an embodiment, FIG. 12B illustrates a vibration provision scheme according to various embodiments, which is a scheme of outputting a vibration by adding a feeling of a chord or harmony to the existing on/off scheme. For example, this scheme may be a scheme of outputting a first vibration of a first frequency and a second vibration of a second frequency by partially overlapping or not overlapping the same.

FIG. 13 is an example of configuring feedback to be different for each function of the electronic device by crossing frequency patterns in the consonant/dissonant relationship. For example, according to various embodiments, each of the various notifications (e.g., reception of a call, SOS, a notification, a system notification (e.g., operation notification), and the like) of the electronic device may be configured as an intuitive vibration pattern for each function.

According to an embodiment, in the case of the reception of a call (ringer), a harmonic vibration obtained by crossing frequency patterns in the consonance relationship (e.g., at least two consonant frequencies) may be set. According to an embodiment, in the case of an SOS, a disharmonic vibration obtained by crossing frequency patterns in the dissonance relationship (e.g., at least two dissonant frequencies) may be set. According to an embodiment, in the case of a notification, a vibration which is distinct for each feature of a notification (for each type of notification) (e.g., low-knock, high-chopstick, a harmonic-bell, or the like) may be set.

According to an embodiment, in the case of a system (operation) notification, a vibration which is distinct for each related operation (function) (e.g., connect, disconnect, low battery, or the like) may be set. For example, using an upward/downward combination of frequencies corresponding to homophony (unison) or a perfect fifth, a vibration associated with starting/ending, connecting/disconnecting, or the like may be more distinctively provided. For example, cognition on the basis of hearing using auditory user interface (AUI) logic may be easier than cognition on the basis of a vibration frequency (or pitch). Therefore, according to various embodiments, the user's discernment of vibration feedback can be improved using frequencies (or pitches) having a large difference therebetween. Also, according to various embodiments, discernment of vibration feedback may be improved by also using the difference in length between vibrations.

Figure 14:
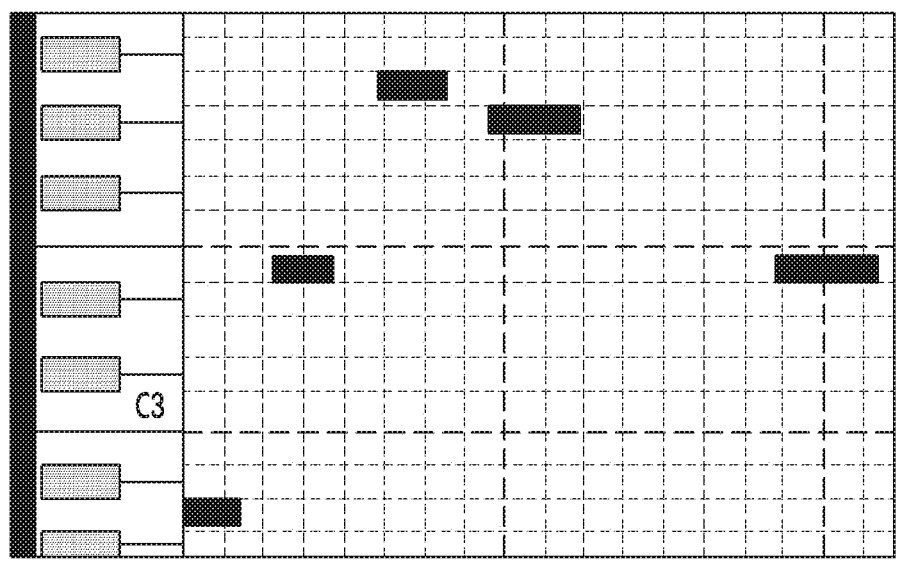
FIG. 14 is a diagram illustrating an example of generation of a vibration in an electronic device according to various embodiments.
Figure 15:
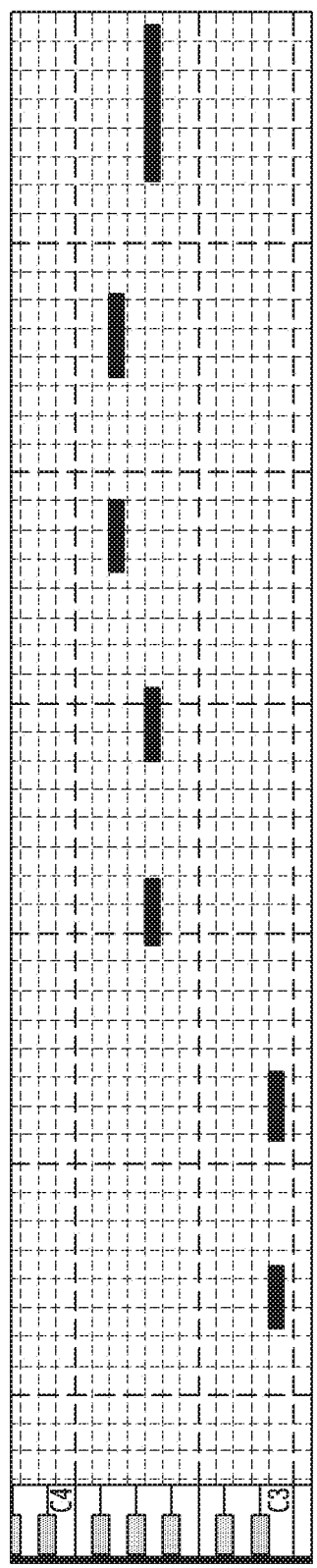
FIG. 15 is a diagram illustrating an example of generation of a vibration in an electronic device according to various embodiments.

FIGS. 14 and 15 are diagrams illustrating examples of generation of a vibration in an electronic device according to various embodiments.

FIGS. 14 and 15 illustrate examples of setting a user's unique vibration (e.g., a melodic vibration) using a musical element (e.g., a pitch, a scale, a frequency, or the like) in the electronic device. For example, FIGS. 14 and 15 illustrate examples of generation of a vibration with a melody (e.g., a melodic vibration) using a motor supporting a wide frequency band according to various embodiments.

FIG. 14 illustrates an example of converting a predetermined melody into a frequency and configuring a vibration pattern. According to an embodiment, FIG. 14 illustrates an example of the configuration of a vibration pattern using a predetermined melody (e.g., ti ti fa# ti la# fa#-B2,B2,F#3, B3,A#3,F#3), using a frequency range (110 Hz to 220 Hz) corresponding to a musical element (e.g., A2 to A3).

Referring to FIG. 15, FIG. 15 illustrates an example of converting a predetermined melody (Twinkle Twinkle Little Star) into frequencies and configuring a vibration pattern. This embodiment is an example of a vibration pattern configured based on at least a part (e.g., do do sol sol la la sol-C3C3G3G3A3A3G3) of a melody (e.g., Twinkle Twinkle Little Star) using a frequency range (110 Hz to 220 Hz) corresponding to a musical element (e.g., A2 to A3).

According to various embodiments, as shown in FIGS. 14 and 15, a vibration pattern may be configured on the basis of multiple vibrations corresponding to multiple frequencies. According to an embodiment, a user's unique melodic vibration may be configured, and user recognition via vibration feedback may be improved.

Figure 16A:
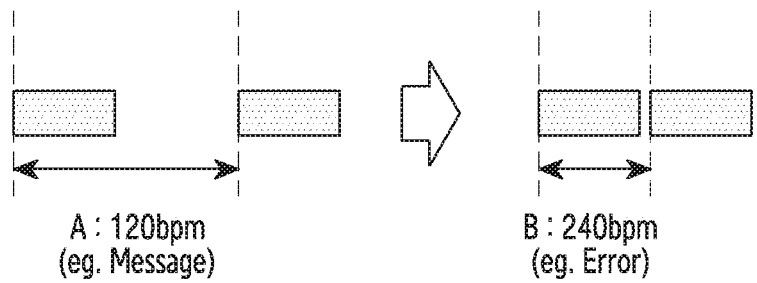
FIG. 16A is a diagram illustrating an example of generation of a vibration in an electronic device according to various embodiments.
Figure 16B:
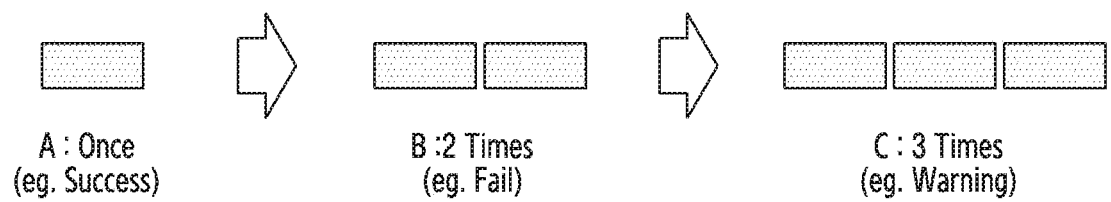
FIG. 16B is a diagram illustrating an example of generation of a vibration in an electronic device according to various embodiments.
Figure 16C:
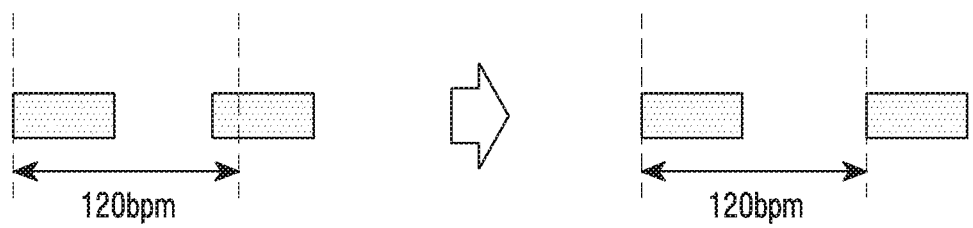
FIG. 16C is a diagram illustrating an example of generation of a vibration in an electronic device according to various embodiments.

FIGS. 16A to 16C are diagrams illustrating examples of generation of a vibration in an electronic device according to various embodiments.

FIGS. 16A to 16C illustrate examples of setting a vibration associated with the importance of a situation (e.g., the level of urgency of a vibration feedback) using a musical element (e.g., a tempo (beat), a length, repetition, or the like) in the electronic device. For example, according to various embodiments, the level of urgency of a situation may be controlled by utilizing a tempo and/or repetition of a musical element, and thus a feel of a vibration that is more dynamic may be represented.

According to an embodiment, FIG. 16A illustrates an example of setting the level of urgency to be different for each function (e.g., system) of an electronic device, by controlling the tempo of a vibration according to tempo control. For example, as illustrated in FIG. 16A, in the case of a message, a vibration may be set to tempo A (e.g., 120 bpm). In the case of an error, a vibration may be set to tempo B (e.g., 240 bpm).

According to an embodiment, FIG. 16B illustrates an example of setting the level of urgency or the level of variation to be different for each function (e.g., system) of an electronic device by controlling the tempo and repetition of a vibration. For example, as illustrated in FIG. 16B, in the case of success, a vibration may be set to repetition A (e.g., one time). In the case of failure (fail), a vibration may be set to repetition B (e.g., two times). In the case of warning, a vibration may be set to repetition C (e.g., three times). For example, according to various embodiments, a tempo and/or repetition may be set to be different for each function (or system) of the electronic device. Vibrations having the same tempo may be distinguished on the basis of the degree of repetition. Vibrations of which repetition are set to be the same may be distinguished on the basis of a tempo. Variations may be distinguished on the basis of a tempo and repetition.

According to an embodiment, FIG. 16C illustrates an example of quantizing (quantization) a vibration (e.g., correcting a difference in timing of generation of vibration) on the basis of musical beats (e.g., 2 beats, 3 beats, 4 beats, 5 beats, or the like). For example, as illustrated in FIG. 16C, when the electronic device generates a vibration, the electronic device may synchronize (or simultaneously generate) the vibration with a sound in order to comply with the beat.

Figure 17:
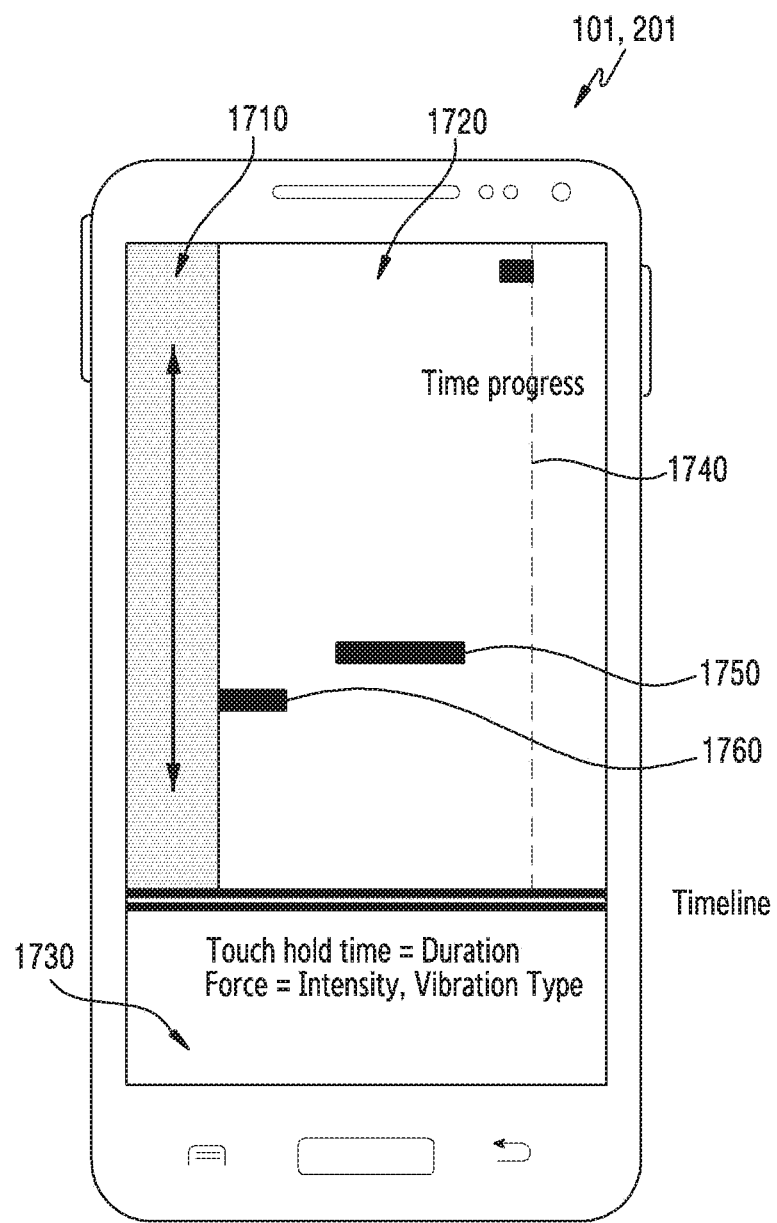
FIG. 17 is a diagram illustrating an example of generating a vibration by a user in an electronic device according to various embodiments.

FIG. 17 is a diagram illustrating an example of generating a vibration by a user in an electronic device according to various embodiments.

FIG. 17 illustrates an example of a user interface (e.g., an authoring user interface) for supporting a user to author a vibration in an electronic device (e.g., the electronic device 101 and 201 of FIG. 1 or FIG. 2).

Referring to FIG. 17, an authoring user interface according to various embodiments may distinguish a first area 1710 for inputting the frequency of a vibration, a second area 1720 for displaying a vibration based on a user input, and a third area 1730 for setting various options of a variation, and the like. For example, according to various embodiments, a personalized vibration pattern may be authored via the user interface including the divided areas (e.g., the first area 1710, the second area 1720, the third area 1730, and the like) and touch interaction provided by a user using each divided area of the user interface.

The first area 1710 may be a frequency-setting area for inputting (setting) a frequency value for a vibration on the basis of a user input (e.g., a touch). For example, the first area 1710 may be an area for inputting a frequency value based on a user input in a wide frequency band supported by the motor 298 of the electronic device 101 and 201. According to an embodiment, in the first area 1710, an upper part corresponds to a higher frequency. A lower part corresponds to a lower frequency. According to an embodiment, a user may perform a touch on a predetermined area in the first area 1710, and the electronic device 101 and 201 may recognize a frequency corresponding to the touched area and may map a vibration corresponding to the corresponding frequency.

According to various embodiments, while vibration authoring is being performed, when a user input (e.g., a touch) is not detected in the first area 1710, a predetermined frequency, such as a resonant frequency, and the like may be set to be automatically input.

According to various embodiments, in consideration of the intuition of a user, the first area 1710 may be provided as a GUI associated with an object (e.g., the keys of a piano) via which a melody is input in a predetermined instrument (e.g., a piano, guitar, violin, or the like). Also, text or icons corresponding to a musical element (e.g., a scale) may be also marked on the object of the predetermined instrument. Accordingly, a user can set a desired melodic vibration by playing a corresponding instrument via the electronic device.

The second area 1720 may be a progress indication area that provides a progress bar 1740 indicating an input and the current time on the basis of a timeline, and provides the progress of a vibration set by the user. According to various embodiments, the state of a vibration (e.g., vibrations 1750 and 1760) corresponding to a user input obtained via the first area 1710 and/or the third area 1730 may be provided via the second area 1720. According to an embodiment, the timeline of the time axis (e.g., the x axis) may move from the right to the left on the basis of a point of view at which a user views the electronic device 101 and 201. A first vibration 1760 may be generated on the basis of a first touch at a first frequency of the first area 1710 of the frequency axis (the y axis). A second vibration 1750 may be generated on the basis of a second touch at a second frequency of the first area 1720.

The third area 1730 may be an option-setting area for inputting (setting) various options related to vibration on the basis of user input. According to an embodiment, the user may input (set) an on/off time (e.g., duration) value corresponding to a touch hold time associated with a touch held by the user, via the third area 1730. According to an embodiment, the user may change qualities such as an intensity and/or vibration type (e.g., a continuous or discontinuous predetermined period) using a force touch in the third area 1730.

According to various embodiments, the electronic device 101 and 201 may provide a quantization (quantize) function for arranging or standardizing a value obtained through user input, such as a frequency, a length, an intensity, and the like. For example, when generating a vibration on the basis of user input via a user interface, the electronic device 101 and 201 may correct a difference in generation timing of a vibration, so as to synchronize the vibration with a musical element (e.g., a sound, a beat, or the like). According to an embodiment, a quantization process may be processed so as to generate the sound of music (or a beat) and the vibration simultaneously.

According to various embodiments, the third area 1730 may be an area for displaying information related to options set by a user, or may be omitted. In this instance, a vibration-related setting which corresponds to the third area 1730 may be provided on the basis of the first area 1710. For example, a user may set a frequency on the basis of user input in the first area 1730, and the intensity of a vibration and/or vibration type may be set on the basis of a hold and/or force touch in the first area 1730.

According to various embodiments, a user may perform interaction related to generation of a vibration using a user interface displayed in a display (e.g., the display 160 and 260 of FIG. 1 or FIG. 2), and the electronic device 101 and 201 may recognize a corresponding frequency on the basis of the interaction with the user. The electronic device 101 and 201 may generate multiple vibrations corresponding to multiple frequencies on the basis of interaction with a user via a user interface. For example, the electronic device 101 and 201 may detect a user input via a user interface, and may set an operating frequency, length, tempo, intensity, or the like of a vibration on the basis of the user input.

According to various embodiments, in addition to explicit user input by the user, according to selection, by the user, of a predetermined music (or melody) provided in the electronic device 101 and 201, the electronic device 101 and 201 may reproduce the music (or the melody), may recognize a musical element (e.g., a frequency, tempo, beat, length, intensity (pitch or octave), or the like) from the reproduced music (or melody), and may automatically generate multiple vibrations on the basis of at least one recognized musical element.

According to various embodiments, it has been described that a musical element for a vibration frequency may be provided on the basis of a predetermined music (or melody) or may be provided on the basis of a user input (a touch input for selecting a frequency using a user interface), as described above. However, the disclosure is not limited to those embodiments. For example, according to various embodiments, a vibration frequency may be generated or changed on the basis of one of the various types of inputs, such as a force touch input (selecting a vibration frequency on the basis of the intensity of the pressure of a touch), a motion input (selecting a vibration frequency on the basis of the motion of an electronic device), a voice or audio input (e.g., selecting a vibration frequency on the basis of a user voice frequency via a microphone), and the like.

Figure 18:
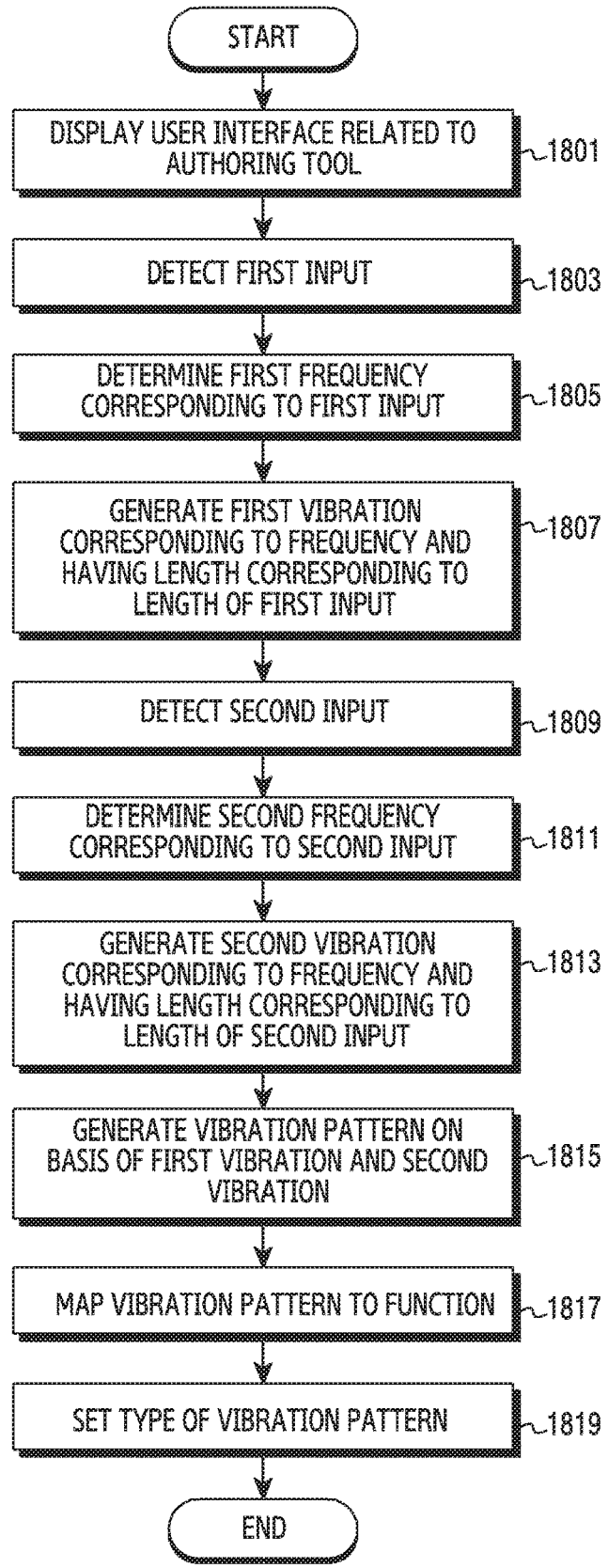
FIG. 18 is a flowchart illustrating an operation of setting a user's vibration via a user interface in an electronic device according to various embodiments.

FIG. 18 is a flowchart illustrating an operation of setting a user's vibration via a user interface in an electronic device according to various embodiments.

Referring to FIG. 18, in operation 1801, the processor 210 of the electronic device may display a user interface (e.g., the user interface of FIG. 17) related to an authoring tool. According to an embodiment, a user may execute a vibration-authoring tool of the electronic device in order to generate a vibration, and the processor 210 may display the user interface via the display 160 and 260 in response to execution of the authoring tool.

In operation 1803, the processor 210 may detect a first input (e.g., a first touch) by the user via the user interface. For example, the user may touch a predetermined area corresponding to a first frequency in the first area 1710 of the user interface, and the processor 210 may detect a first touch by the user in the first area 1710.

In operation 1805, the processor 210 may determine the first frequency corresponding to the first input. For example, the processor 210 may recognize the first frequency mapped to the touched area in the first area 1710 of the user interface.

In operation 1807, the processor 210 may generate a first vibration, corresponding to the recognized frequency and having a length corresponding to the length of the first input. For example, the processor 210 may configure the first vibration based on the first frequency. According to an embodiment, when configuring the first vibration, the processor 210 may set the first vibration in consideration of the intensity of the first vibration, the vibration type, or the like, on the basis of a force touch and/or hold time of a user input.

In operation 1809, the processor 210 may detect a second input (e.g., a second touch) by the user via the user interface. For example, after setting the first vibration based on the first input, the user may touch a predetermined area corresponding to a second frequency in the first area 1710 of the user interface, and the processor 210 may detect a second touch by the user in the first area 1720.

In operation 1811, the processor 210 may determine a second frequency corresponding to the second input. For example, the processor 210 may recognize the second frequency mapped to the touched area in the first area 1710 of the user interface.

In operation 1813, the processor 210 may generate a second vibration, corresponding to the recognized frequency and having a length corresponding to the length of the second input. For example, the processor 210 may configure the second vibration based on the second frequency. According to an embodiment, when configuring the second vibration, the processor 210 may set the second vibration in consideration of the intensity and/or vibration type of the first vibration or the like on the basis of a force touch and/or hold time of a user input.

In operation 1815, the processor 210 may generate a vibration pattern on the basis of the first vibration and the second vibration. According to an embodiment, the processor 210 may generate the first vibration and the second vibration, and may generate a single vibration pattern using vibrations that have been generated up to that time (e.g., the first vibration and the second vibration) in response to a vibration authoring complete command (or input) (e.g., selecting completion of generating a vibration pattern or selecting storing of a vibration pattern) by the user. According to various embodiments, when generating a vibration pattern, the processor 210 may perform a quantization (quantize) function in consideration of the musical element of the first vibration and the second vibration.

In operation 1817, the processor 210 may map the generated vibration pattern to a predetermined function of the electronic device. According to an embodiment, when the user generates a vibration pattern, the user can designate a function (or system) of the electronic device for which the generated vibration pattern is to be used. According to various embodiments, mapping between a vibration pattern and a function may not be performed immediately after generating the vibration pattern. For example, the user may generate only a vibration pattern, and may map a stored vibration pattern and a function using a menu or the like of the electronic device in the future (e.g., at another point in time different from the point in time at which the vibration pattern is generated).

In operation 1819, the processor 210 may set the type of vibration pattern. According to an embodiment, when the user maps a vibration pattern to a function, the user may additionally set the number of times that the vibration pattern is to be repeated, and the processor 210 may additionally perform a process of setting the type of vibration pattern in response to the user selection. According to various embodiments, operation 1819 is not limited to the above-described sequential position, and, for example, may be performed before operation 1817.

According to various embodiments, the processor 210 may store the generated vibration pattern after operation 1815. As described above, operation 1817 and/or operation 1819 may be omitted, or may be performed in response to a request from a user at another point in time.

Figure 19:
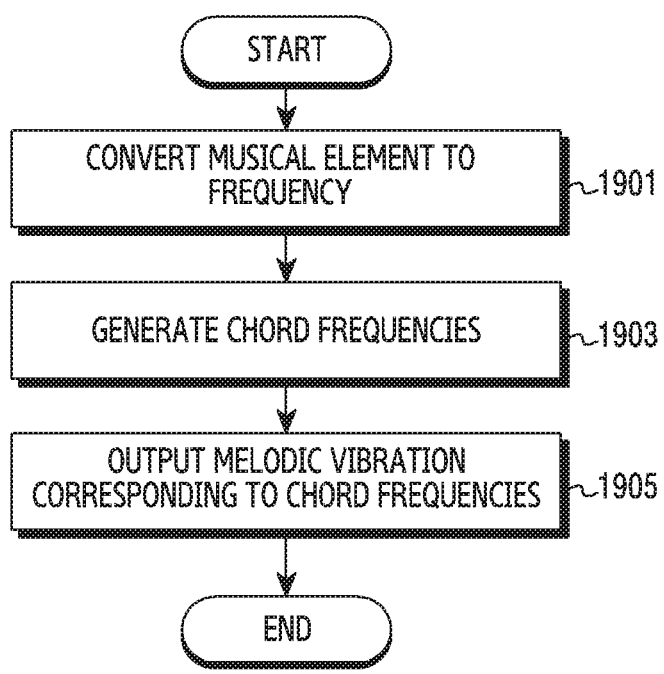
FIG. 19 is a flowchart illustrating an operation of outputting a vibration in an electronic device according to various embodiments.

FIG. 19 is a flowchart illustrating an operation of outputting, by an electronic device, a vibration according to various embodiments.

Referring to FIG. 19, in operation 1901, the processor 210 of the electronic device may convert a musical element into a frequency. According to an embodiment, as described above, the processor 210 may extract a musical element (e.g. a scale) from a predetermined music (or a melody) set for a vibration, and may recognize multiple frequencies corresponding to each extracted musical element. According to an embodiment, the predetermined music (melody) set for a vibration may be music used in order for a user to author a vibration, or may be music currently reproduced in the electronic device on the basis of a user selection.

In operation 1903, the processor 210 may generate chord frequencies (or vibration frequencies) on the basis of the multiple frequencies. For example, the processor 210 may set multiple frequencies to have a melody according to a musical element.

In operation 1905, the processor 210 may output a melodic vibration corresponding to the chord frequencies. For example, the processor 210 may generate a vibration with the feel of a melody using respective vibrations corresponding to chord frequencies on the basis of a musical element (e.g., a tempo, beat, length, intensity, or the like). According to an embodiment, the processor 210 may sequentially output a motor-driving signal corresponding to the chord frequencies to a motor according to a musical element, and the motor may operate in response to the motor-driving signal and may generate a melodic vibration.

According to various embodiments, when an event related to output of a vibration from the inside or the outside is detected, the processor 210 may generate a vibration corresponding to consonance or dissonance on the basis of a frequency associated with the event. For example, according to various embodiments, a consonant vibration may be generated or a dissonant vibration may be generated depending on a predetermined situation.

Figure 20:
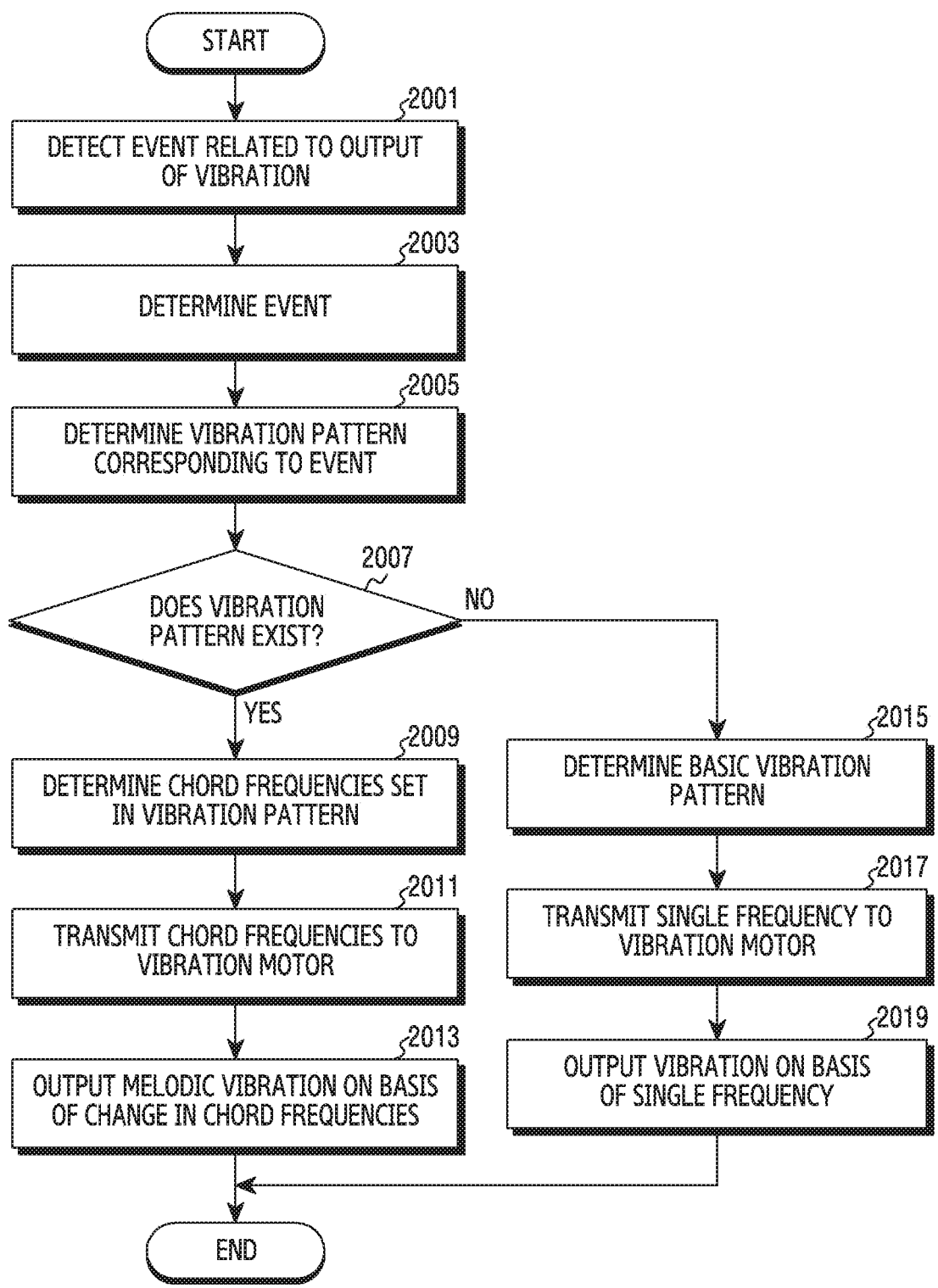
FIG. 20 is a flowchart illustrating an operation of outputting a vibration in an electronic device according to various embodiments.

FIG. 20 is a flowchart illustrating an operation of outputting, by an electronic device, a vibration according to various embodiments.

Referring to FIG. 20, in operation 2001, the processor 210 of the electronic device may detect an event related to output of a vibration. According to an embodiment, on the basis of detection of a state of providing a vibration notification to a user when the electronic device is set to a vibration mode, or detection of a state of providing a vibration notification to a user while the electronic device operates, the processor 210 may determine an event related to output of a vibration. For example, the event related to output of a vibration may include an internal event, such as a notification generated inside the electronic device, and an external event, such as reception of a message generated from the outside.

In operation 2003, the processor 210 may determine an event. For example, the processor 210 may analyze a detected event and may determine the type of event (or attribute).

In operation 2005, the processor 210 may determine a vibration pattern corresponding to the event.

In operation 2007, on the basis of the result of the determination in operation 2005, the processor 210 may determine whether a first vibration pattern of a melodic vibration based on a musical element is set in the event, or whether a second vibration pattern of a normal (or basic) vibration pattern is set.

When it is determined that the first vibration pattern is set in operation 2007 (Yes in operation 2007), the processor 210 may determine the chord frequencies set in the vibration pattern in operation 2009. According to various embodiments, in the case of the first vibration pattern, the vibration pattern may be set to be different on the basis of multiple vibrations different for each function (or system) of the electronic device. The processor 210 may further recognize (or extract or search for) a corresponding first vibration pattern on the basis of the type of event.

In operation 2011, the processor 210 may output (transmit) a motor-driving signal corresponding to the chord frequencies (e.g., multiple frequencies) to the motor. In operation 2013, a melodic vibration is output on the basis of a change in the chord frequencies. For example, the processor 210 may generate a vibration with the feel of a melody using each vibration corresponding to the chord frequencies on the basis of a musical element (e.g., a tempo, beat, length, intensity, or the like). According to an embodiment, the processor 210 may sequentially output a motor-driving signal corresponding to the chord frequencies to a motor according to a musical element, and the motor may operate in response to the motor-driving signal and may generate a melodic vibration.

According to various embodiments, when generating the melodic vibration on the basis of the change in the chord frequencies, the processor 210 may generate the vibration on the basis of consonance or dissonance of the chord frequencies. For example, according to various embodiments, a consonant vibration may be generated or a dissonant vibration may be generated depending on the situation.

When it is determined that the first vibration pattern is not set in operation 2007 (No in operation 2007), the processor 210 may determine a basic vibration pattern in operation 2015.

In operation 2017, the processor 210 may output (transmit), to the motor, a motor-driving signal corresponding to a single frequency (e.g., a resonant frequency) on the basis of the basic vibration pattern. In operation 2019, a vibration is output on the basis of the single frequency.

Figure 21:
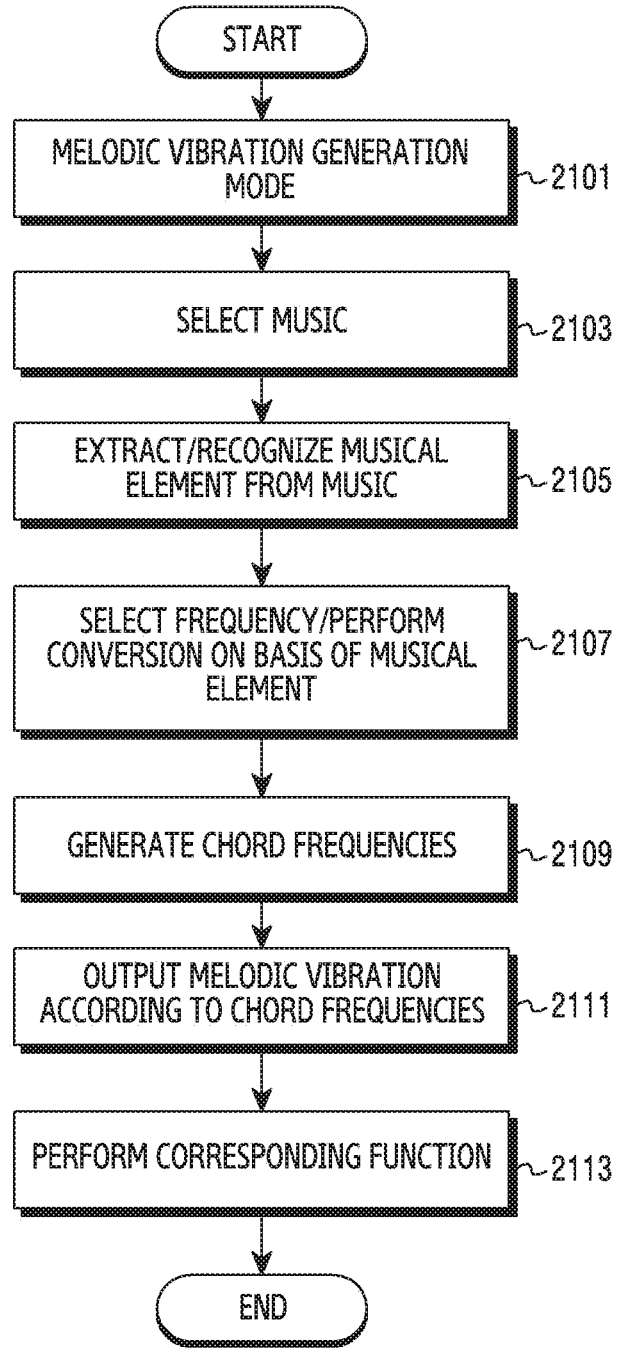
FIG. 21 is a flowchart illustrating an operation of generating a vibration in an electronic device according to various embodiments.

FIG. 21 is a flowchart illustrating an operation of generating, by an electronic device, a vibration according to various embodiments.

Referring to FIG. 21, in operation 2101, the processor 210 of the electronic device may enter a melodic vibration generation mode. According to an embodiment, a user may execute a mode for generating a melodic vibration on the basis of a musical element (e.g., may execute an authoring tool), and the processor 210 may execute a melodic vibration generation mode in response to a user request.

In operation 2103, the processor 210 may select music. For example, the processor 210 may have a predetermined music (or melody) designated (or selected) by the user in order to generate a vibration. According to an embodiment, the processor 210 may provide a list of music (or melodies) stored in the electronic device in response to entry into the melodic vibration generation mode, and may have music selected by the user. According to an embodiment, the processor 210 may access a content server capable of selecting (designating) music (or a melody) in response to entry into the melodic vibration generation mode, may provide a list of music (or melodies) provided from the content server, and may obtain music selected by the user. According to an embodiment, the processor 210 may display a user interface for inputting music (or melodies) via a display in response to entry into the melodic vibration generation mode, and may directly receive an input associated with music (or melodies) from the user via the user interface.

In operation 2105, the processor 210 may extract and/or recognize a musical element from music. According to an embodiment, the processor 210 may extract or recognize, for example, a tempo (beat), a length, repetition, a pitch, a scale, or the like from the selected music.

In operation 2107, the processor 210 may select a frequency or may perform conversion according to the musical element. According to an embodiment, the processor 210 may extract a musical element (e.g. a scale) from the music (or melody), and may recognize multiple frequencies corresponding to each extracted musical element, or may obtain the multiple frequencies via conversion.

In operation 2109, the processor 210 may generate chord frequencies. For example, the processor 210 may generate chord frequencies (or vibration frequencies) on the basis of the multiple frequencies. For example, the processor 210 may set multiple frequencies to have a melody according to a musical element.

In operation 2111, the processor 210 may output a melodic vibration corresponding to the chord frequencies. For example, the processor 210 may generate a vibration conveying the feel of a melody using respective vibrations corresponding to the chord frequencies on the basis of a musical element (e.g., a tempo, beat, length, intensity, or the like). According to an embodiment, the processor 210 may sequentially output a motor-driving signal corresponding to the chord frequencies to a motor according to a musical element, and the motor may operate in response to the motor-driving signal and may generate a melodic vibration.

In operation 2113, the processor 210 may process a corresponding operation. According to an embodiment, the processor 210 may edit a melodic vibration on the basis of a user input. For example, the processor 210 may configure a vibration pattern using at least some sections selected from the output melodic vibration on the basis of a user input. According to an embodiment, the processor 210 may map the vibration pattern based on at least a part of the melodic vibration to a function of the electronic device corresponding to a user selection.

As described above, an operation method of an electronic device according to various embodiments may include: selecting multiple frequencies using a musical element from a frequency band supported by a vibration-generating device; setting at least one vibration on the basis of the selected multiple frequencies; and generating a vibration pattern on the basis of the set vibration.

According to various embodiments, the vibration-generating device may support a wide frequency band, and may include at least one of a motor, a vibrator, an actuator, or a haptic generation device.

According to various embodiments, the multiple frequencies may be a plurality of frequencies, which are included in a frequency band supported by the vibration-generating device, and which are the same as or different from each other.

According to various embodiments, the operation of setting the vibration may include: setting a first vibration corresponding to a first frequency among the multiple frequencies; setting a second vibration corresponding to a second frequency among the multiple frequencies; and generating a single vibration pattern by combining the first vibration and the second vibration.

According to various embodiments, the operation of setting the vibration may include: determining the vibration corresponding to the selected multiple frequencies on the basis of at least a part of the musical element.

According to various embodiments, the operation of selecting the multiple frequencies may include selecting the multiple frequencies on the basis of user interaction, and the user interaction may include at least one of a touch input to a designated area, a force touch input using a strength of a pressure, or an audio (or voice) input.

According to various embodiments, the operation of selecting the multiple frequencies may include: selecting the multiple frequencies by recognizing the musical element from selected music.

According to various embodiments, the operation of generating the vibration pattern may include: setting at least one of a length, a section, an intensity, or a speed for each of the first vibration and the second vibration, and generating the vibration pattern.

According to various embodiments, the same frequency or different frequencies are set for the first vibration and the second vibration, the sections of the first vibration and the second vibration at least partially overlap each other, or the first vibration and the second vibration are independently distinguished on the basis of their lengths.

According to various embodiments, the operation method of the electronic device may include: detecting an event (e.g., an internal event and an external event) related to output of a vibration; and outputting a vibration using a combination of multiple frequencies based on consonance or dissonance depending on the event.

The embodiments of the disclosure disclosed herein and shown in the drawings are merely specific examples presented in order to easily describe technical details of the disclosure and to help the understanding of the disclosure, and are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. An electronic device, comprising:
    a display;
    a vibration-generating device configured to generate a vibration; and
    a processor functionally connected to the display and to the vibration-generating device, and configured to:
        select multiple frequencies from a frequency band supported by the vibration-generating device based on at least one of a tempo, a length, a repetition, a pitch, or a scale,
        set at least one vibration based on the selected multiple frequencies,
        generate a vibration pattern based on the set at least one vibration,
        detect an event related to an output of a vibration, and
        output, via the vibration-generation device, the vibration using a combination of multiple frequencies,
    wherein at least two of the multiple frequencies are in a consonant and dissonant relationship depending on the event.

2. The electronic device as claimed in claim 1, wherein the vibration-generating device supports a wide frequency band, and comprises at least one of a motor, a vibrator, an actuator, or a haptic generation device.

3. The electronic device as claimed in claim 2, wherein the multiple frequencies are a plurality of frequencies included in the frequency band supported by the vibration-generating device, and are the same as or different from each other.

4. The electronic device as claimed in claim 1, wherein the processor is further configured to:
    set a first vibration corresponding to a first frequency among the multiple frequencies;
    set a second vibration corresponding to a second frequency among the multiple frequencies; and
    generate a single vibration pattern by combining the first vibration and the second vibration.

5. The electronic device as claimed in claim 4, wherein the processor is further configured to:
    generate the vibration pattern based on setting at least one of a length, a section, an intensity, or a speed for each of the first vibration and the second vibration.

6. The electronic device as claimed in claim 4, wherein sections of the first vibration and the second vibration at least partially overlap each other, or the first vibration and the second vibration are independently distinguished based on lengths thereof.

7. The electronic device as claimed in claim 1, wherein the processor is further configured to determine the vibration corresponding to the selected multiple frequencies based on at least a part of the at least one of the tempo, the length, the repetition, the pitch, or the scale.

8. The electronic device as claimed in claim 1, wherein the processor is further configured to:
    recognize the at least one of the tempo, the length, the repetition, the pitch, or the scale from selected music; and
    select the multiple frequencies.

9. The electronic device as claimed in claim 1,
    wherein the processor is further configured to:
        select the multiple frequencies based on a user interaction, and
    wherein the user interaction comprises at least one of a touch input to a designated area, a force touch input using a strength of a pressure, or an audio input.

10. An operation method of an electronic device, the method comprising:
    selecting multiple frequencies from a frequency band supported by a vibration-generating device based on at least one of a tempo, a length, a repetition, a pitch, or a scale;
    setting at least one vibration based on the selected multiple frequencies;
    generating a vibration pattern based on the set at least one vibration;
    detecting an event related to output of a vibration; and
    outputting, via the vibration-generating device, a vibration using a combination of multiple frequencies,
    wherein at least two of the multiple frequencies are in a consonant and dissonant relationship depending on the event.

11. The operation method as claimed in claim 10, wherein the vibration-generating device supports a wide frequency band, and comprises at least one of a motor, a vibrator, an actuator, or a haptic generation device.

12. The operation method as claimed in claim 11,
    wherein the selecting the multiple frequencies comprises selecting the multiple frequencies based on user interaction, and
    wherein the user interaction comprises at least one of a touch input to a designated area, a force touch input using a strength of a pressure, or an audio input.

13. The operation method as claimed in claim 10, wherein the setting the at least one vibration comprises:
    setting a first vibration corresponding to a first frequency among the multiple frequencies;
    setting a second vibration corresponding to a second frequency among the multiple frequencies; and
    generating a single vibration pattern by combining the first vibration and the second vibration.

14. The operation method as claimed in claim 13, wherein the generating the vibration pattern comprises generating the vibration pattern based on setting at least one of a length, a section, an intensity, or a speed for each of the first vibration and the second vibration.

15. The operation method as claimed in claim 14, wherein sections of the first vibration and the second vibration at least partially overlap each other, or the first vibration and the second vibration are independently distinguished based on lengths thereof.

16. The operation method as claimed in claim 10, wherein the setting the vibration comprises:
  determining the vibration corresponding to the selected multiple frequencies based on at least a part of the at least one of the tempo, the length, the repetition, the pitch, or the scale.

17. The operation method as claimed in claim 10, wherein the selecting the multiple frequencies comprises selecting the multiple frequencies by recognizing the at least one of the tempo, the length, the repetition, the pitch, or the scale from selected music.

18. The operation method as claimed in claim 10, wherein the multiple frequencies are a plurality of frequencies, included in the frequency band supported by the vibration-generating device, and are the same as or different from each other.

* * * * *